US012484737B2

(12) United States Patent
Bannister et al.

(10) Patent No.: US 12,484,737 B2
(45) Date of Patent: *Dec. 2, 2025

(54) VACUUM FOOD PROCESSING SYSTEM

(71) Applicants: SharkNinja Operating LLC, Needham, MA (US); SharkNinja (Hong Kong) Company Limited, Hong Kong (CN)

(72) Inventors: Sam William Bannister, London (GB); Nicholas Michael O'Loughlin, Hong Kong (CN)

(73) Assignee: SharkNinja Operating LLC, Needham, MA (US)

( * ) Notice: Subject to any disclaimer, the term of this patent is extended or adjusted under 35 U.S.C. 154(b) by 142 days.

This patent is subject to a terminal disclaimer.

(21) Appl. No.: 18/474,543

(22) Filed: Sep. 26, 2023

(65) Prior Publication Data

US 2024/0008686 A1  Jan. 11, 2024

Related U.S. Application Data

(63) Continuation of application No. 16/813,227, filed on Mar. 9, 2020, now Pat. No. 11,771,265.

(60) Provisional application No. 62/816,004, filed on Mar. 8, 2019.

(51) Int. Cl.
*A47J 43/00* (2006.01)
*A47J 43/046* (2006.01)
*A47J 43/07* (2006.01)

(52) U.S. Cl.
CPC ......... *A47J 43/046* (2013.01); *A47J 43/0722* (2013.01); *A47J 43/0727* (2013.01)

(58) Field of Classification Search
CPC ... A47J 43/046; A47J 43/0722; A47J 43/0727
See application file for complete search history.

(56) References Cited

U.S. PATENT DOCUMENTS

| 293,190 | A | 2/1884 | Moore |
| 959,581 | A | 5/1910 | Newton |
| 1,997,914 | A | 4/1935 | Pollard |
| 2,121,621 | A | 6/1938 | Adams |
| 2,121,622 | A | 6/1938 | Bean |
| 2,209,559 | A | 7/1940 | Brennan |

(Continued)

FOREIGN PATENT DOCUMENTS

| CN | 87102824 | 10/1987 |
| CN | 1073149 | 6/1993 |

(Continued)

OTHER PUBLICATIONS

US 6,592,248 B2, 07/2003, Kressin (withdrawn)

(Continued)

*Primary Examiner* — Anshu Bhatia
(74) *Attorney, Agent, or Firm* — The Webb Law Firm

(57) ABSTRACT

A reservoir assembly for a food processing system including a vacuum mechanism includes a housing having a hollow interior, an inlet pipe extending through said housing into said hollow interior, a fluid flow path from said hollow interior to the vacuum mechanism, and a valve positioned within said hollow interior, said valve being movable to control a flow of air provided to the vacuum mechanism via said fluid flow path.

18 Claims, 20 Drawing Sheets

(56) References Cited

U.S. PATENT DOCUMENTS

| | | |
|---|---|---|
| 2,355,010 A | 8/1944 | Valentino |
| 2,616,593 A | 11/1952 | Leibenhaut |
| 2,761,659 A | 9/1956 | Collura |
| 2,885,134 A | 5/1959 | Cohen |
| 2,992,118 A | 7/1961 | Duane |
| 3,288,344 A | 11/1966 | Woollen |
| 3,406,868 A | 10/1968 | Rogers |
| 3,521,863 A | 7/1970 | Graham |
| 3,534,435 A | 10/1970 | John |
| 3,557,411 A | 1/1971 | Ravasi |
| D242,208 S | 11/1976 | Madl et al. |
| 4,016,998 A | 4/1977 | Finch |
| 4,185,072 A | 1/1980 | Frakes, Jr. |
| D255,313 S | 6/1980 | Elkerbout |
| 4,645,097 A | 2/1987 | Kaufman |
| 4,928,857 A | 5/1990 | Ecker |
| 4,955,724 A | 9/1990 | Otto |
| 5,005,717 A | 4/1991 | Oilar |
| 5,168,797 A | 12/1992 | Wang |
| 5,257,862 A | 11/1993 | Gardner |
| 5,328,262 A | 7/1994 | Lidgren |
| D349,455 S | 8/1994 | Kostanecki et al. |
| 5,348,391 A | 9/1994 | Murray |
| D351,993 S | 11/1994 | Kauffman et al. |
| 5,368,386 A | 11/1994 | Murray |
| 5,423,476 A | 6/1995 | Ferrer |
| 5,460,264 A | 10/1995 | Rupert |
| 5,501,520 A | 3/1996 | Lidgren |
| 5,558,257 A | 9/1996 | Braun |
| 5,597,089 A | 1/1997 | Smith |
| 5,603,567 A | 2/1997 | Peacock |
| D378,493 S | 3/1997 | Subbaraman et al. |
| D380,674 S | 7/1997 | Smith |
| 5,662,032 A | 9/1997 | Baratta |
| 5,667,101 A | 9/1997 | Barrash |
| 5,690,021 A | 11/1997 | Grey |
| 5,797,680 A | 8/1998 | Murray |
| 5,857,771 A | 1/1999 | Draenert |
| D413,798 S | 9/1999 | Lamarra |
| 5,957,340 A | 9/1999 | Sawicki |
| 6,065,861 A | 5/2000 | Chen |
| 6,092,905 A | 7/2000 | Koehn |
| 6,135,019 A | 10/2000 | Chou |
| 6,213,358 B1 | 4/2001 | Libit |
| 6,223,652 B1 | 5/2001 | Calia |
| 6,321,977 B1 | 11/2001 | Lee |
| 6,491,961 B1 | 12/2002 | Balentine |
| 6,499,873 B1 | 12/2002 | Chen |
| 6,527,430 B2 | 3/2003 | Osborn |
| 6,712,496 B2 | 3/2004 | Kressin |
| D490,468 S | 5/2004 | Akers |
| 6,780,454 B2 | 8/2004 | Balentine |
| D498,642 S | 11/2004 | Huang |
| D498,643 S | 11/2004 | Pryor, Jr. et al. |
| 6,817,280 B2 | 11/2004 | Hall |
| 6,817,750 B1 | 11/2004 | Sands |
| 6,840,157 B2 | 1/2005 | Wang |
| 6,860,313 B2 | 3/2005 | Greissing |
| 6,962,432 B2 | 11/2005 | Hofeldt |
| D518,332 S | 4/2006 | Feil |
| 7,029,162 B2 | 4/2006 | Villwock |
| 7,044,051 B2 | 5/2006 | Le Rouzic |
| 7,055,684 B2 | 6/2006 | Anderson |
| 7,066,640 B2 | 6/2006 | Sands |
| 7,100,851 B2 | 9/2006 | Hiraki |
| 7,104,185 B2 | 9/2006 | Leung |
| D530,568 S | 10/2006 | Wingenter |
| D537,303 S | 2/2007 | Stuckey |
| D538,595 S | 3/2007 | White et al. |
| 7,204,385 B2 | 4/2007 | Rockhill |
| D559,037 S | 1/2008 | Johansson |
| D560,512 S | 1/2008 | Safar |
| 7,314,136 B2 | 1/2008 | Stefandl |
| D564,832 S | 3/2008 | Bodum |
| 7,422,362 B2 | 9/2008 | Sands |
| D578,340 S | 10/2008 | Picozza et al. |
| 7,430,957 B2 | 10/2008 | Sands |
| 7,441,944 B2 | 10/2008 | Sands |
| 7,490,743 B2 | 2/2009 | Herzog |
| 7,543,925 B2 | 6/2009 | Ishizawa |
| D605,462 S | 12/2009 | Picozza et al. |
| 7,675,212 B2 | 3/2010 | Kobayashi |
| 7,858,135 B2 | 12/2010 | Radosav |
| 7,938,574 B2 | 5/2011 | McGill |
| 7,958,819 B2 | 6/2011 | Sands |
| D642,858 S | 8/2011 | Lazzer |
| D644,072 S | 8/2011 | McDonald et al. |
| D644,875 S | 9/2011 | Audette |
| 8,021,699 B2 | 9/2011 | Yoshikawa |
| D647,357 S | 10/2011 | Audette et al. |
| D647,367 S | 10/2011 | Audette et al. |
| 8,047,124 B2 | 11/2011 | Lin |
| 8,047,702 B1 | 11/2011 | Lopresti |
| D654,316 S | 2/2012 | Audette |
| 8,122,821 B2 | 2/2012 | Sands |
| D663,580 S | 7/2012 | Vagnby |
| D668,115 S | 10/2012 | Potter |
| D670,958 S | 11/2012 | Picozza et al. |
| 8,383,180 B2 | 2/2013 | Vastardis |
| D677,976 S | 3/2013 | Palermo et al. |
| 8,387,520 B2 | 3/2013 | Backus |
| 8,475,860 B2 | 7/2013 | Colantonio |
| 8,485,383 B2 | 7/2013 | Taufer |
| 8,561,314 B2 | 10/2013 | Krueger |
| 8,568,811 B2 | 10/2013 | Sasame |
| 8,586,117 B2 | 11/2013 | Vastardis |
| 8,672,533 B2 | 3/2014 | Reyes |
| 8,703,222 B2 | 4/2014 | Yao |
| D704,502 S | 5/2014 | Coakley et al. |
| D705,606 S | 5/2014 | Coakley et al. |
| 8,770,099 B2 | 7/2014 | Reyhanloo |
| D711,688 S | 8/2014 | Prats |
| 8,807,022 B2 | 8/2014 | Backus |
| 8,815,318 B2 | 8/2014 | Zoss |
| D712,188 S | 9/2014 | Averty |
| 8,869,686 B2 | 10/2014 | Backus |
| D721,536 S | 1/2015 | Advani |
| 8,960,084 B2 | 2/2015 | Lee |
| 8,960,578 B2 | 2/2015 | Byrne |
| 8,960,993 B2 | 2/2015 | Cheio |
| D727,173 S | 4/2015 | De Jong |
| 8,997,633 B2 | 4/2015 | Bishop |
| 8,998,176 B2 | 4/2015 | Bishop |
| D728,381 S | 5/2015 | Ferraro |
| 9,039,274 B1 | 5/2015 | Corda |
| D730,682 S | 6/2015 | Tu |
| D730,683 S | 6/2015 | Tu |
| D731,242 S | 6/2015 | Machovina et al. |
| D731,243 S | 6/2015 | Machovina et al. |
| 9,051,073 B2 | 6/2015 | Jennings |
| D733,488 S | 7/2015 | Tu |
| D734,637 S | 7/2015 | Benoit et al. |
| 9,113,750 B2 | 8/2015 | Clark |
| D739,678 S | 9/2015 | Benoit et al. |
| D740,063 S | 10/2015 | Katz |
| 9,149,065 B2 | 10/2015 | Hoare |
| D742,691 S | 11/2015 | Zhang |
| D743,204 S | 11/2015 | Zhang |
| 9,173,525 B2 | 11/2015 | McGill |
| 9,199,779 B2 | 12/2015 | Zoss |
| D747,135 S | 1/2016 | Ha |
| 9,295,358 B2 | 3/2016 | Vastardis |
| D755,003 S | 5/2016 | Palermo et al. |
| 9,345,795 B2 | 5/2016 | Saura Lopez |
| 9,402,405 B2 | 8/2016 | Vastardis |
| 9,402,410 B2 | 8/2016 | So |
| 9,414,711 B2 | 8/2016 | Tonelli |
| D765,465 S | 9/2016 | Du |
| D767,334 S | 9/2016 | Pan |
| 9,433,226 B2 | 9/2016 | Bauer |
| D768,437 S | 10/2016 | Lane |
| D769,061 S | 10/2016 | Diderotto |
| 9,474,403 B2 | 10/2016 | Chen |
| D771,434 S | 11/2016 | Burrows |

(56) References Cited

U.S. PATENT DOCUMENTS

| | | |
|---|---|---|
| D771,999 S | 11/2016 | Kettavong et al. |
| 9,486,107 B2 | 11/2016 | Kobylarz |
| D776,978 S | 1/2017 | Machovina et al. |
| 9,555,384 B2 | 1/2017 | Haney |
| D778,665 S | 2/2017 | Barquin et al. |
| D779,265 S | 2/2017 | Barquin et al. |
| 9,565,872 B2 | 2/2017 | Corkin |
| D780,507 S | 3/2017 | Barquin et al. |
| D783,340 S | 4/2017 | Palermo et al. |
| D783,355 S | 4/2017 | Tu |
| D784,761 S | 4/2017 | Tu |
| 9,624,024 B2 | 4/2017 | Vilinsky |
| 9,630,828 B1 | 4/2017 | Gardner |
| D789,735 S | 6/2017 | Palermo et al. |
| D789,736 S | 6/2017 | Palermo et al. |
| 9,675,212 B2 | 6/2017 | Hewitt |
| 9,687,111 B1 * | 6/2017 | Trojan ................ G06F 12/0895 |
| D793,153 S | 8/2017 | Tu |
| D794,384 S | 8/2017 | Lee |
| D797,496 S | 9/2017 | Gee, II et al. |
| D798,101 S | 9/2017 | Rose et al. |
| 9,763,461 B2 | 9/2017 | Vastardis |
| 9,775,467 B2 | 10/2017 | Sapire |
| D804,248 S | 12/2017 | Tu |
| D807,700 S | 1/2018 | Tu |
| D808,718 S | 1/2018 | Coakley |
| D808,719 S | 1/2018 | Coakley |
| 9,855,535 B2 | 1/2018 | Arnett |
| D809,333 S | 2/2018 | Lee |
| 9,888,807 B2 | 2/2018 | Starr |
| D811,806 S | 3/2018 | Bock |
| D813,603 S | 3/2018 | Tu |
| D813,604 S | 3/2018 | Tu |
| 9,907,430 B2 | 3/2018 | Vastardis |
| 9,924,821 B1 | 3/2018 | Shamas |
| 9,924,824 B2 | 3/2018 | Backus |
| 9,924,837 B1 | 3/2018 | Trojan |
| 9,924,838 B2 | 3/2018 | Potter |
| 9,930,986 B2 | 4/2018 | Arai et al. |
| D816,383 S | 5/2018 | Liang |
| 9,962,030 B2 | 5/2018 | Avins et al. |
| 9,993,105 B2 | 6/2018 | Bishop et al. |
| 9,999,319 B2 | 6/2018 | Kim |
| D821,806 S | 7/2018 | Coakley et al. |
| 10,055,347 B1 | 8/2018 | Trojan |
| D832,029 S | 10/2018 | Gee, II et al. |
| 10,105,003 B2 | 10/2018 | Tsutsumi et al. |
| 10,117,444 B2 | 11/2018 | Vastardis et al. |
| 10,123,650 B2 | 11/2018 | McLaughlin et al. |
| 10,130,924 B2 | 11/2018 | Lucon et al. |
| D834,878 S | 12/2018 | Moon et al. |
| D835,463 S | 12/2018 | Coakley |
| 10,143,323 B2 | 12/2018 | Backus |
| 10,182,680 B2 | 1/2019 | Koetz |
| 10,196,595 B2 | 2/2019 | Butte |
| 10,213,047 B2 | 2/2019 | Boggavarapu |
| D842,643 S | 3/2019 | Mullen et al. |
| D842,644 S | 3/2019 | Kettavong et al. |
| 10,226,147 B2 | 3/2019 | Harper |
| D846,337 S | 4/2019 | Duan et al. |
| D846,338 S | 4/2019 | Smith et al. |
| D846,339 S | 4/2019 | Smith |
| 10,285,528 B2 | 5/2019 | Upston et al. |
| 10,299,629 B2 | 5/2019 | Bascom et al. |
| 10,299,630 B2 | 5/2019 | Chung |
| D851,982 S | 6/2019 | Deleo et al. |
| 10,321,786 B2 | 6/2019 | Kim |
| D852,566 S | 7/2019 | Chen |
| 10,334,979 B2 | 7/2019 | Barquin et al. |
| 10,334,986 B2 | 7/2019 | Gross et al. |
| 10,383,481 B2 | 8/2019 | Kim |
| D860,724 S | 9/2019 | Kassin et al. |
| 10,455,985 B2 | 10/2019 | Lee |
| D865,438 S | 11/2019 | Coakley et al. |
| D867,804 S | 11/2019 | Gronkowski |
| 10,517,419 B2 | 12/2019 | Beber et al. |
| 10,517,436 B2 | 12/2019 | Arnett et al. |
| 10,556,208 B2 | 2/2020 | Moon |
| 10,617,260 B2 | 4/2020 | Sapire |
| 10,638,867 B2 | 5/2020 | Zhang et al. |
| 10,654,654 B2 | 5/2020 | Iwasaka et al. |
| 10,667,644 B2 | 6/2020 | Gormley et al. |
| 10,674,856 B2 | 6/2020 | Avins et al. |
| 10,736,465 B2 | 8/2020 | Dickson, Jr. et al. |
| 10,746,459 B2 | 8/2020 | Roekens et al. |
| 10,766,158 B2 | 9/2020 | Arriens et al. |
| 10,779,675 B2 | 9/2020 | Ford et al. |
| 10,799,071 B2 | 10/2020 | Pamplin |
| 10,905,286 B2 | 2/2021 | Cuaresma |
| D919,368 S | 5/2021 | Bannister et al. |
| D924,007 S | 7/2021 | Bannister et al. |
| D924,621 S | 7/2021 | Bannister et al. |
| D925,270 S | 7/2021 | Bannister et al. |
| D925,284 S | 7/2021 | Bannister et al. |
| 11,058,251 B2 | 7/2021 | Tonelli et al. |
| D927,256 S | 8/2021 | Bannister et al. |
| 11,110,418 B2 | 9/2021 | Furman et al. |
| 11,116,354 B2 | 9/2021 | Vastardis et al. |
| 11,304,565 B2 | 4/2022 | Bannister et al. |
| 11,684,215 B2 | 6/2023 | Bannister et al. |
| 11,759,056 B2 | 9/2023 | Bannister et al. |
| 11,771,265 B2 * | 10/2023 | Bannister ............... A47J 43/046 |
| | | 366/205 |
| 2001/0000570 A1 | 5/2001 | Aarts |
| 2002/0009401 A1 | 1/2002 | Osborn |
| 2003/0227818 A1 | 12/2003 | Villwock et al. |
| 2004/0025703 A1 | 2/2004 | Wang |
| 2004/0065668 A1 | 4/2004 | Lee |
| 2004/0155063 A1 | 8/2004 | Hofeldt |
| 2004/0159243 A1 | 8/2004 | Theodos |
| 2004/0173105 A1 | 9/2004 | Kim et al. |
| 2004/0195120 A1 | 10/2004 | Anderson |
| 2004/0208079 A1 | 10/2004 | Hein |
| 2005/0229795 A1 | 10/2005 | Stuckey |
| 2005/0269336 A1 | 12/2005 | Rockhill et al. |
| 2006/0000369 A1 | 1/2006 | Hsu |
| 2006/0120215 A1 | 6/2006 | Sands |
| 2006/0124536 A1 | 6/2006 | Guerrero |
| 2007/0183256 A1 | 8/2007 | Sands |
| 2008/0037360 A1 | 2/2008 | McGill |
| 2008/0067195 A1 | 3/2008 | Jennings et al. |
| 2009/0084275 A1 | 4/2009 | Liang |
| 2009/0165655 A1 | 7/2009 | Aonuma |
| 2009/0229478 A1 | 9/2009 | Wu |
| 2009/0266787 A1 | 10/2009 | Son |
| 2009/0297671 A1 | 12/2009 | Basker et al. |
| 2010/0003379 A1 | 1/2010 | Zoss et al. |
| 2010/0203209 A1 | 8/2010 | Fishbein et al. |
| 2011/0127297 A1 | 6/2011 | Jennings et al. |
| 2012/0152131 A1 | 6/2012 | Sands |
| 2012/0196014 A1 | 8/2012 | Yao |
| 2013/0133521 A1 | 5/2013 | Vastardis |
| 2014/0247686 A1 | 9/2014 | Arnett et al. |
| 2014/0286123 A1 | 9/2014 | Arnett |
| 2014/0290503 A1 | 10/2014 | Bae |
| 2015/0059597 A1 | 3/2015 | Lee |
| 2015/0098299 A1 | 4/2015 | Sapire |
| 2015/0138910 A1 | 5/2015 | Cha et al. |
| 2015/0201808 A1 | 7/2015 | Katsuki et al. |
| 2015/0208844 A1 | 7/2015 | Liang |
| 2015/0351567 A1 | 12/2015 | Tristram |
| 2016/0220071 A1 | 8/2016 | Hewitt |
| 2016/0256003 A1 | 9/2016 | Altenritter |
| 2016/0324358 A1 | 11/2016 | Backus |
| 2016/0324369 A1 | 11/2016 | Lee |
| 2016/0331182 A1 | 11/2016 | Golino |
| 2016/0367063 A1 | 12/2016 | Vastardis et al. |
| 2017/0007067 A1 | 1/2017 | Shima et al. |
| 2017/0049260 A1 | 2/2017 | Beber et al. |
| 2017/0086622 A1 * | 3/2017 | Chung ................ A47J 43/0716 |
| 2017/0095122 A1 | 4/2017 | Hoare et al. |
| 2017/0143155 A1 | 5/2017 | Lin |
| 2017/0150744 A1 | 6/2017 | Wangler |
| 2017/0164776 A1 | 6/2017 | Floessholzer et al. |

(56) References Cited

U.S. PATENT DOCUMENTS

| | | | |
|---|---|---|---|
| 2017/0224166 | A1 | 8/2017 | Sedlacek et al. |
| 2017/0231431 | A1 | 8/2017 | Maeng |
| 2017/0295982 | A1 | 10/2017 | Holzbauer et al. |
| 2017/0295992 | A1 | 10/2017 | Mangold et al. |
| 2017/0303571 | A1 | 10/2017 | Alden |
| 2017/0341253 | A1 | 11/2017 | Arriens |
| 2018/0043321 | A1 | 2/2018 | Mochizuki |
| 2018/0079584 | A1 | 3/2018 | Jung |
| 2018/0098666 | A1 | 4/2018 | Lee |
| 2018/0220829 | A1* | 8/2018 | Zhang ................. A47J 43/0716 |
| 2018/0225205 | A1 | 8/2018 | Trojan |
| 2018/0360271 | A1 | 12/2018 | Katsuki et al. |
| 2019/0000272 | A1 | 1/2019 | Katsuki et al. |
| 2019/0059409 | A1 | 2/2019 | Vastardis et al. |
| 2020/0281408 | A1 | 9/2020 | Bannister et al. |
| 2020/0281409 | A1 | 9/2020 | Bannister et al. |
| 2020/0281410 | A1 | 9/2020 | Bannister et al. |
| 2021/0078776 | A1 | 3/2021 | Sterngold et al. |

FOREIGN PATENT DOCUMENTS

| | | |
|---|---|---|
| CN | 1255841 | 6/2000 |
| CN | 2390533 | 8/2000 |
| CN | 1424885 | 6/2003 |
| CN | 1432518 | 7/2003 |
| CN | 1162115 | 8/2004 |
| CN | 1525830 | 9/2004 |
| CN | 1586378 | 3/2005 |
| CN | 1589720 | 3/2005 |
| CN | 1213686 | 8/2005 |
| CN | 1655707 | 8/2005 |
| CN | 2730269 | 10/2005 |
| CN | 1792306 | 6/2006 |
| CN | 1268263 | 8/2006 |
| CN | 2808015 | 8/2006 |
| CN | 1282438 | 11/2006 |
| CN | 100337572 | 9/2007 |
| CN | 201001611 | 1/2008 |
| CN | 101181127 | 5/2008 |
| CN | 201067329 | 6/2008 |
| CN | 101238036 | 8/2008 |
| CN | 100418461 | 9/2008 |
| CN | 101291609 | 10/2008 |
| CN | 100522753 | 8/2009 |
| CN | 101522039 | 9/2009 |
| CN | 100581426 | 1/2010 |
| CN | 101637242 | 2/2010 |
| CN | 101663142 | 3/2010 |
| CN | 201505039 | 6/2010 |
| CN | 101779928 | 7/2010 |
| CN | 101854839 | 10/2010 |
| CN | 102058327 | 5/2011 |
| CN | 102083345 | 6/2011 |
| CN | 102123600 | 7/2011 |
| CN | 201899357 | 7/2011 |
| CN | 201977619 | 9/2011 |
| CN | 102245068 | 11/2011 |
| CN | 102292011 | 12/2011 |
| CN | 102355839 | 2/2012 |
| CN | 102429590 | 5/2012 |
| CN | 102631153 | 8/2012 |
| CN | 102670096 | 9/2012 |
| CN | 202681713 | 1/2013 |
| CN | 202698925 | 1/2013 |
| CN | 102984951 | 3/2013 |
| CN | 202875005 | 4/2013 |
| CN | 103126552 | 6/2013 |
| CN | 203074329 | 7/2013 |
| CN | 103354793 | 10/2013 |
| CN | 203447138 | 2/2014 |
| CN | 103720339 | 4/2014 |
| CN | 103813741 | 5/2014 |
| CN | 103857317 | 6/2014 |
| CN | 203647102 | 6/2014 |
| CN | 103960992 | 8/2014 |
| CN | 104305872 | 1/2015 |
| CN | 204274217 | 4/2015 |
| CN | 104720553 | 6/2015 |
| CN | 104853657 | 8/2015 |
| CN | 204600200 | 9/2015 |
| CN | 204698308 | 10/2015 |
| CN | 105455688 | 4/2016 |
| CN | 105520659 | 4/2016 |
| CN | 105682517 | 6/2016 |
| CN | 105686701 | 6/2016 |
| CN | 105902133 | 8/2016 |
| CN | 105919396 | 9/2016 |
| CN | 105996826 | 10/2016 |
| CN | 205658804 | 10/2016 |
| CN | 106073538 | 11/2016 |
| CN | 106108596 | 11/2016 |
| CN | 106108599 | 11/2016 |
| CN | 106108709 | 11/2016 |
| CN | 106136903 | 11/2016 |
| CN | 106136961 | 11/2016 |
| CN | 106136962 | 11/2016 |
| CN | 205697388 | 11/2016 |
| CN | 106231966 | 12/2016 |
| CN | 106235907 | 12/2016 |
| CN | 106264202 | 1/2017 |
| CN | 106333616 | 1/2017 |
| CN | 106361183 | 2/2017 |
| CN | 106377152 | 2/2017 |
| CN | 106377181 | 2/2017 |
| CN | 106419642 | 2/2017 |
| CN | 106580132 | 4/2017 |
| CN | 106580133 | 4/2017 |
| CN | 206062911 | 4/2017 |
| CN | 106659310 | 5/2017 |
| CN | 106724559 | 5/2017 |
| CN | 106724947 | 5/2017 |
| CN | 106742714 | 5/2017 |
| CN | 106798496 | 6/2017 |
| CN | 206227556 | 6/2017 |
| CN | 106974565 | 7/2017 |
| CN | 206295245 | 7/2017 |
| CN | 206324658 | 7/2017 |
| CN | 107019425 | 8/2017 |
| CN | 107019441 | 8/2017 |
| CN | 107049072 | 8/2017 |
| CN | 107088005 | 8/2017 |
| CN | 107095598 | 8/2017 |
| CN | 107148234 | 9/2017 |
| CN | 107157356 | 9/2017 |
| CN | 107212772 | 9/2017 |
| CN | 206453647 | 9/2017 |
| CN | 107224225 | 10/2017 |
| CN | 107280517 | 10/2017 |
| CN | 107303150 | 10/2017 |
| CN | 107319965 | 11/2017 |
| CN | 107373278 | 11/2017 |
| CN | 107411477 | 12/2017 |
| CN | 107411589 | 12/2017 |
| CN | 206688628 | 12/2017 |
| CN | 107595164 | 1/2018 |
| CN | 206867155 | 1/2018 |
| CN | 107713697 | 2/2018 |
| CN | 107713825 | 2/2018 |
| CN | 107788844 | 3/2018 |
| CN | 107822529 | 3/2018 |
| CN | 107874651 | 4/2018 |
| CN | 107912982 | 4/2018 |
| CN | 207168385 | 4/2018 |
| CN | 107997525 | 5/2018 |
| CN | 108013791 | 5/2018 |
| CN | 108065810 | 5/2018 |
| CN | 108078438 | 5/2018 |
| CN | 207341667 | 5/2018 |
| CN | 108143312 | 6/2018 |
| CN | 207506464 | 6/2018 |
| CN | 108272359 | 7/2018 |
| CN | 108283444 | 7/2018 |
| CN | 207613666 | 7/2018 |
| CN | 207640256 | 7/2018 |

(56) References Cited

FOREIGN PATENT DOCUMENTS

| | | |
|---|---|---|
| CN | 108378725 | 8/2018 |
| CN | 108415344 | 8/2018 |
| CN | 108451395 | 8/2018 |
| CN | 108471901 | 8/2018 |
| CN | 108478009 | 9/2018 |
| CN | 108577547 | 9/2018 |
| CN | 108577597 | 9/2018 |
| CN | 108601485 | 9/2018 |
| CN | 108606663 | 10/2018 |
| CN | 108652478 | 10/2018 |
| CN | 108670063 | 10/2018 |
| CN | 207940815 | 10/2018 |
| CN | 108720603 | 11/2018 |
| CN | 108742189 | 11/2018 |
| CN | 108903698 | 11/2018 |
| CN | 208030887 | 11/2018 |
| CN | 109044075 | 12/2018 |
| CN | 109091035 | 12/2018 |
| CN | 109124296 | 1/2019 |
| EP | 0676161 | 10/1995 |
| EP | 3424380 | 1/2019 |
| FR | 2866545 | 8/2005 |
| GB | 2556646 | 6/2018 |
| KR | 101821786 | 1/2018 |
| WO | 2005089601 | 9/2005 |
| WO | 2008034020 | 3/2008 |
| WO | 2008095309 | 8/2008 |
| WO | 2009001244 | 12/2008 |
| WO | 2013041466 | 3/2013 |
| WO | 2015097606 | 7/2015 |
| WO | 2016072203 | 5/2016 |
| WO | 2016165454 | 10/2016 |
| WO | 2017100326 | 6/2017 |
| WO | 2017147059 | 8/2017 |
| WO | 2017153341 | 9/2017 |
| WO | 2017165422 | 9/2017 |
| WO | 2017181838 | 10/2017 |
| WO | 2017211987 | 12/2017 |
| WO | 2018006776 | 1/2018 |
| WO | 2018007831 | 1/2018 |
| WO | 2018014226 | 1/2018 |
| WO | 2018024371 | 2/2018 |
| WO | 2018043872 | 3/2018 |
| WO | 2018071589 | 4/2018 |
| WO | 2018072504 | 4/2018 |
| WO | 2018072505 | 4/2018 |
| WO | 2018075446 | 4/2018 |
| WO | 2018092997 | 5/2018 |
| WO | 2018103312 | 6/2018 |
| WO | 2018115402 | 6/2018 |
| WO | 2018127716 | 7/2018 |
| WO | 2018135697 | 7/2018 |
| WO | 2018148418 | 8/2018 |
| WO | 2018148954 | 8/2018 |
| WO | 2018159958 | 9/2018 |
| WO | 2018186598 | 10/2018 |
| WO | 2018190537 | 10/2018 |
| WO | 2018231103 | 12/2018 |
| WO | 2018234275 | 12/2018 |
| WO | 2019006983 | 1/2019 |
| WO | 2019007920 | 1/2019 |
| WO | 2019010504 | 1/2019 |
| WO | 2019030803 | 2/2019 |
| WO | 2019030805 | 2/2019 |
| WO | 2019035592 | 2/2019 |
| WO | 2019036486 | 2/2019 |

OTHER PUBLICATIONS

Amazon.com; "Vitamix Con A3300 Ascent Series Smart Blender"; Available on amazon.com Jan. 5, 2017; (Year: 2017); https://www.amazon.com/dp/B01MT67Z7B/; (1 page).
Amazon.com; "Addwin Countertop Blender Professional Commercial Mixer Blender"; Nov. 8, 2018; https:// www.amazon.com/dp/B07KBYWB7L/ (Year: 2018) (1 page).
Action and Response History for U.S. Appl. No. 29/694,049, 64 pages (Sep. 12, 2023).
Action and Response History for U.S. Appl. No. 29/694,050, 58 pages (Sep. 12, 2023).
Action and Response History for U.S. Appl. No. 29/694,051, 34 pages (Sep. 12, 2023).
Action and Response History for U.S. Appl. No. 29/740,272, 30 pages (Sep. 12, 2023).
Action and Response History for U.S. Appl. No. 29/740,552, 28 pages (Sep. 12, 2023).
Action and Response History for U.S. Appl. No. 29/740,562, 28 pages (Sep. 12, 2023).
Action and Response History for U.S. Appl. No. 16/813,212, 44 pages (Sep. 12, 2023).
Action and Response History for U.S. Appl. No. 17/689,789, 46 pages (Sep. 12, 2023).
Action and Response History for U.S. Appl. No. 16/813,222, 131 pages (Sep. 12, 2023).
Action and Response History for U.S. Appl. No. 16/813,227, 37 pages (Sep. 12, 2023).
Communication pursuant to Article 94(3) EPC in Application No. 20717389.9 dated Jan. 10, 2024, 5 pages.

\* cited by examiner

VACUUM FOOD PROCESSING SYSTEM

CROSS-REFERENCE TO RELATED APPLICATIONS

This application is a continuation of co-pending U.S. application Ser. No. 16/813,227, filed on Mar. 9, 2020, entitled VACUUM FOOD PROCESSING SYSTEM, which in turn claims priority to and benefit of U.S. Provisional Application No. 62/816,004, filed on Mar. 8, 2019, the entire contents of which are incorporated herein by reference for all purposes.

BACKGROUND

Exemplary embodiments of the present invention relate to a blender, and more particularly to a container of a blender configured to receive one or more food items therein.

Blenders are commonly used to process a plurality of different food products, including liquids, solids, semi-solids, gels and the like. It is well-known that blenders are useful devices for blending, cutting, and dicing food products in a wide variety of commercial settings, including home kitchen use, professional restaurant or food services use, and large-scale industrial use. They offer a convenient alternative to chopping or dicing by hand, and often come with a range of operational settings and modes adapted to provide specific types or amounts of food processing, e.g., as catered to particular food products.

Several benefits can be achieved by forming a vacuum within a blender container or attachment either prior to or after a blending operation. For example, by forming a vacuum prior to a blending operation, the overall degradation of the nutritional properties of the ingredients being processes may be reduced. Accordingly, a blender container or attachment may include a seal that is movable to selectively form a vacuum within the blender container. However, when the blender container is used in high vibration environments, such as in a vehicle or when the container is being carried in a bag for example, it is possible that liquid or other ingredients from the interior of the blender container may leak through the seal.

SUMMARY

According to an embodiment, a reservoir assembly for a food processing system including a vacuum mechanism includes a housing having a hollow interior, an inlet pipe extending through said housing into said hollow interior, a fluid flow path from said hollow interior to the vacuum mechanism, and a valve positioned within said hollow interior, said valve being movable to control a flow of air provided to the vacuum mechanism via said fluid flow path.

In addition to one or more of the features described above, or as an alternative, in further embodiments said valve is movable between a first position and a second position in response to a volume of contents of said hollow interior.

In addition to one or more of the features described above, or as an alternative, in further embodiments said valve is a float valve, said float valve being buoyant relative to said volume of contents of said hollow interior.

In addition to one or more of the features described above, or as an alternative, in further embodiments when said valve is in said second position, an inlet to said fluid flow path is sealed.

In addition to one or more of the features described above, or as an alternative, in further embodiments said an inlet is offset from a bottom surface of said housing.

In addition to one or more of the features described above, or as an alternative, in further embodiments said valve includes a mating surface and said inlet of said conduit includes a sealing ring, said mating surface and said sealing ring being engaged to seal said conduit when said valve is in said second position.

According to another embodiment, a food processing system includes a vacuum mechanism, an attachment configured for removable association with vacuum mechanism, and a reservoir assembly arranged upstream from said vacuum mechanism relative to a fluid flow provided to said vacuum mechanism from said attachment. The reservoir assembly is positioned relative to said vacuum mechanism and said attachment to collect particulate from said attachment during operation of said vacuum mechanism.

In addition to one or more of the features described above, or as an alternative, in further embodiments said food processing system further comprises a food processor base and said reservoir assembly is associated with said food processor base.

In addition to one or more of the features described above, or as an alternative, in further embodiments said reservoir assembly is removably connectable to said food processor base.

In addition to one or more of the features described above, or as an alternative, in further embodiments said reservoir assembly is disposed at an upper surface of said food processor base.

In addition to one or more of the features described above, or as an alternative, in further embodiments said attachment further comprises a vacuum passage, and said vacuum passage is fluidly connected to said reservoir assembly when said attachment is associated with said food processor base.

In addition to one or more of the features described above, or as an alternative, in further embodiments said reservoir assembly further comprises: a housing having a hollow interior, an inlet for providing fluid to said hollow interior, an outlet fluidly coupled to said vacuum mechanism, and a valve arranged within said hollow interior, said valve being movable to control a flow of fluid provided to said vacuum mechanism.

In addition to one or more of the features described above, or as an alternative, in further embodiments said valve is translatable between a first position and a second position in response to a volume of particulate within said hollow interior.

In addition to one or more of the features described above, or as an alternative, in further embodiments said valve is a float valve, said float valve being buoyant relative to said volume of particulate within said hollow interior.

In addition to one or more of the features described above, or as an alternative, in further embodiments said valve is in said second position when said volume of particulate within said hollow interior exceeds a maximum threshold.

In addition to one or more of the features described above, or as an alternative, in further embodiments when said valve is in said second position, said outlet fluidly coupled to said vacuum mechanism is sealed.

In addition to one or more of the features described above, or as an alternative, in further embodiments operation of said vacuum mechanism is automatically stopped when a fluid flow from said outlet to said vacuum mechanism falls below a minimum threshold.

According to another embodiment, a reservoir assembly for a food processing system including a vacuum mechanism includes a housing having a hollow interior, an inlet pipe extending through said housing into said hollow interior, a fluid flow path from said hollow interior to the vacuum mechanism, and a plurality of electrical contactors positioned within said hollow interior. The plurality of electrical contactors is operable to detect when a volume of liquid within said hollow interior exceeds an allowable threshold.

In addition to one or more of the features described above, or as an alternative, in further embodiments when said volume of liquid within said hollow interior is less than said allowable threshold, said plurality of electrical contactors are not electrically connected.

In addition to one or more of the features described above, or as an alternative, in further embodiments when said volume of liquid within said hollow interior exceeds said allowable threshold, said liquid electrically connects said plurality of electrical contactors.

In addition to one or more of the features described above, or as an alternative, in further embodiments when said volume of liquid within said hollow interior exceeds said allowable threshold, said vacuum mechanism is inactive.

According to another embodiment, a reservoir assembly connectable to an attachment of a food processing system including a vacuum mechanism includes a housing having a hollow interior arrangeable in fluid communication with the vacuum mechanism and an inlet pipe extending through said housing into said hollow interior, said inlet pipe being movable relative to said housing to form a seal with the attachment.

In addition to one or more of the features described above, or as an alternative, in further embodiments said inlet pipe is translatable relative to said housing.

In addition to one or more of the features described above, or as an alternative, in further embodiments said inlet pipe is pivotable relative to said housing.

In addition to one or more of the features described above, or as an alternative, in further embodiments said inlet pipe is movable between a first position and a second position, and in said first position an end of said inlet pipe extends beyond an upper surface of said housing and in said second position, said end of said inlet pipe is arranged flush with or vertically below said upper surface.

In addition to one or more of the features described above, or as an alternative, in further embodiments comprising a movement mechanism operably coupled to said inlet pipe, said movement mechanism including a body and a biasing mechanism operably coupled to said body.

In addition to one or more of the features described above, or as an alternative, in further embodiments said body includes a protrusion that extends beyond an upper surface of said housing, said protrusion including at least one angled surface.

In addition to one or more of the features described above, or as an alternative, in further embodiments said body and said inlet pipe are movable in response to application of a force to said at least one angled surface.

In addition to one or more of the features described above, or as an alternative, in further embodiments said force is generated as the attachment is moved laterally relative to said housing of the reservoir assembly.

In addition to one or more of the features described above, or as an alternative, in further embodiments said movement mechanism further comprises a lever operably coupled to said body, said biasing mechanism being directly connected to said lever.

In addition to one or more of the features described above, or as an alternative, in further embodiments said body includes a first plurality of teeth and said lever includes a second plurality of teeth arranged in meshing engagement with said first plurality of teeth.

In addition to one or more of the features described above, or as an alternative, in further embodiments said body and said inlet pipe are movable in response to application of a force to said lever.

In addition to one or more of the features described above, or as an alternative, in further embodiments said force is generated as the attachment is moved laterally relative to said housing of the reservoir assembly.

BRIEF DESCRIPTION OF THE FIGURES

The accompanying drawings incorporated in and forming a part of the specification embodies several aspects of the present invention and, together with the description, serves to explain the principles of the invention. In the drawings.

The detailed description explains embodiments of the invention, together with advantages and features, by way of example with reference to the drawings.

DETAILED DESCRIPTION

Figure 1:
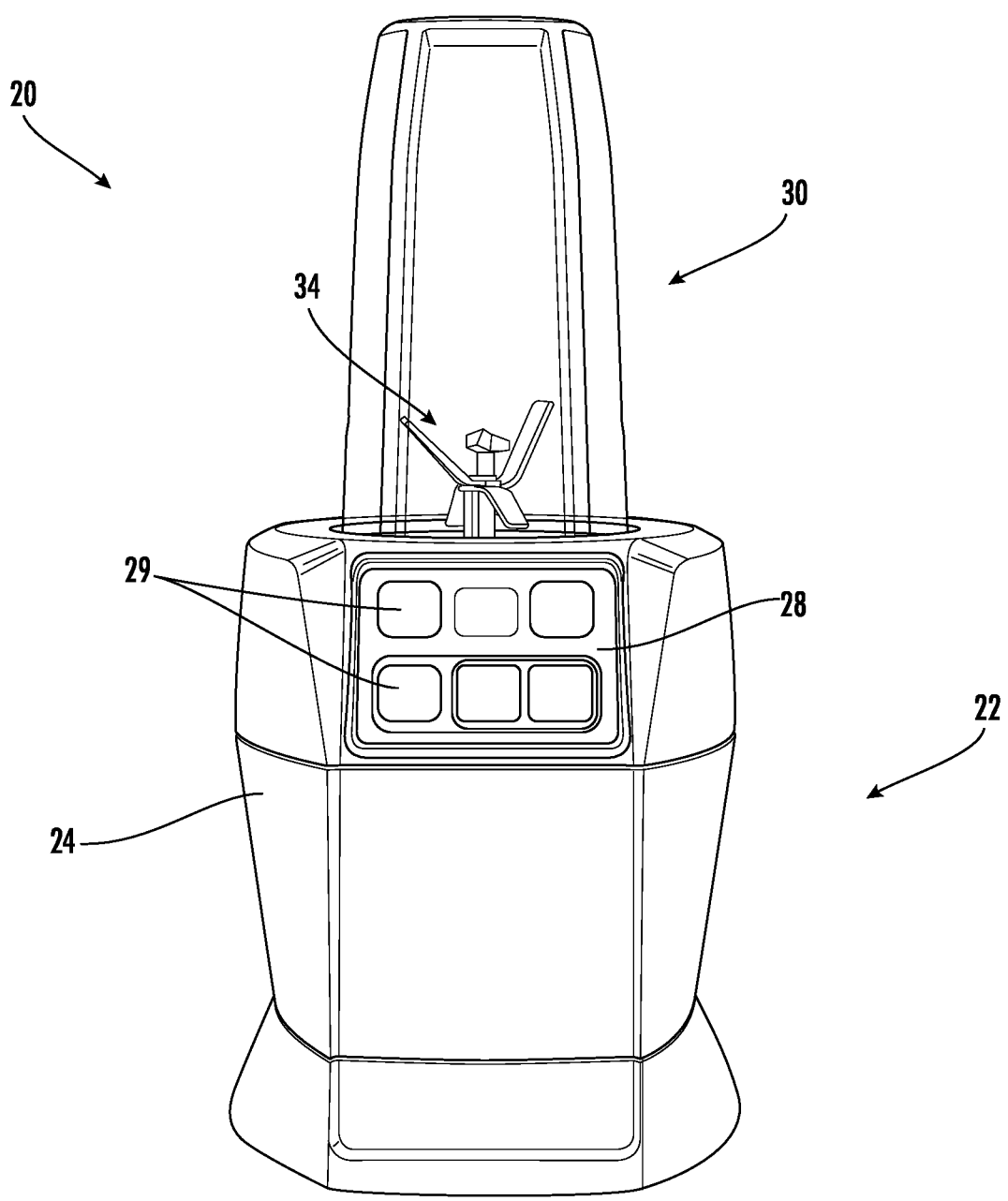
FIG. 1 is a perspective view of an example of a food processing system.
Figure 2:
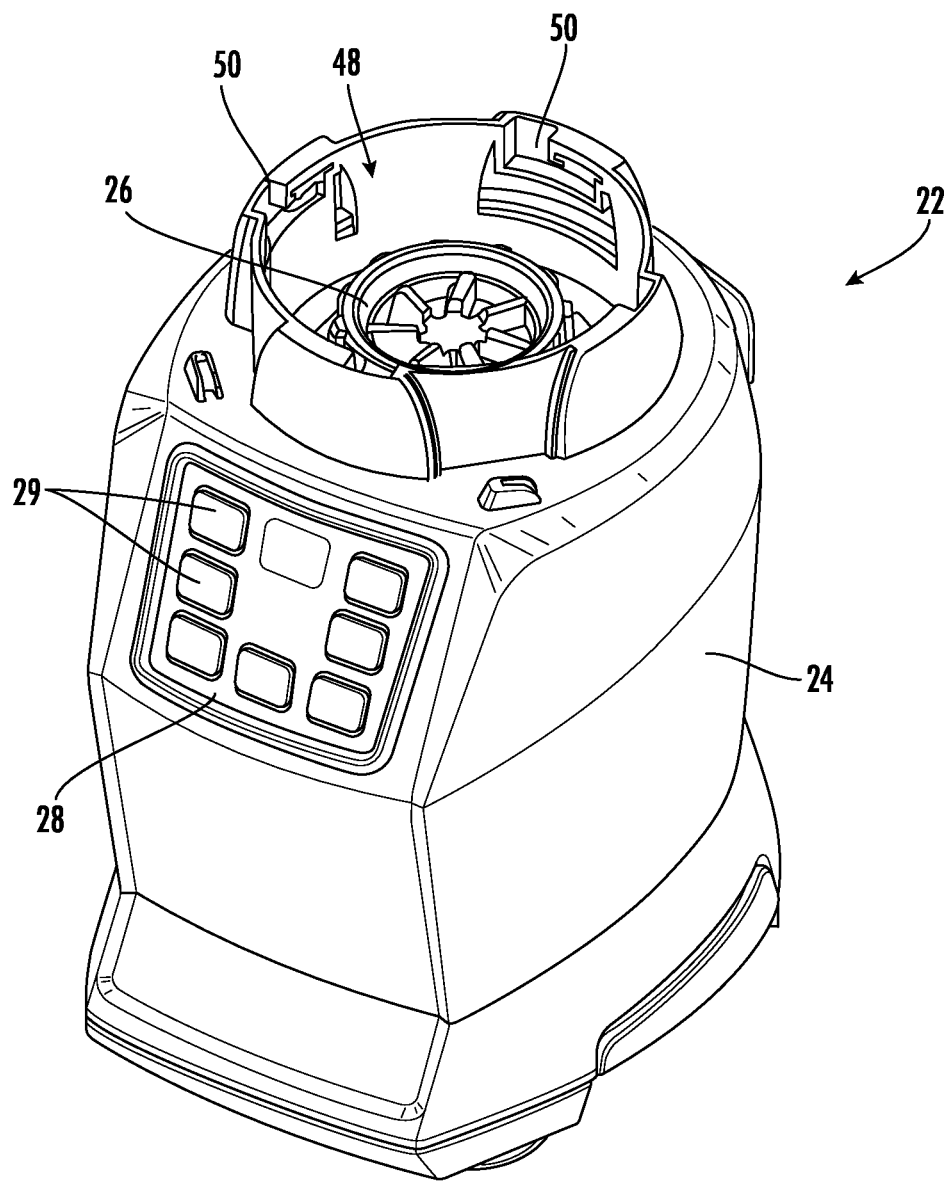
FIG. 2 is a perspective view of a base of a food processing system.

Referring now to FIGS. 1 and 2, an example of a multi-functional food processing system 20 is illustrated. In general, the food processing system 20 can be adapted to perform any food processing or blending operation including as non-limiting examples, dicing, chopping, cutting, slicing, mixing, blending, stirring, crushing, or the like. Although the food processing system 20 illustrated and described herein is a personal blender system, other food processing systems are within the scope of the present disclosure.

The food processing system 20 includes a base 22 having a body or housing 24 within which a motorized unit (not shown) and at least one controller (not shown) are located. The base 22 includes at least one rotary component, such as a drive coupler 26 (see FIG. 2) for example, driven by the motorized unit located within the housing 24. The base 22 additionally includes a control panel or user interface 28 having one or more inputs 29 for turning the motorized unit on and off and for selecting various modes of operation, such as pulsing, blending, or continuous food processing. The at least one drive coupler 26 is configured to engage a portion of an attachment 30 coupled to the base 22 for the processing of food products located within an interior of the attachment 30. This will become more apparent in subsequent FIGS. and discussion.

Figure 3:
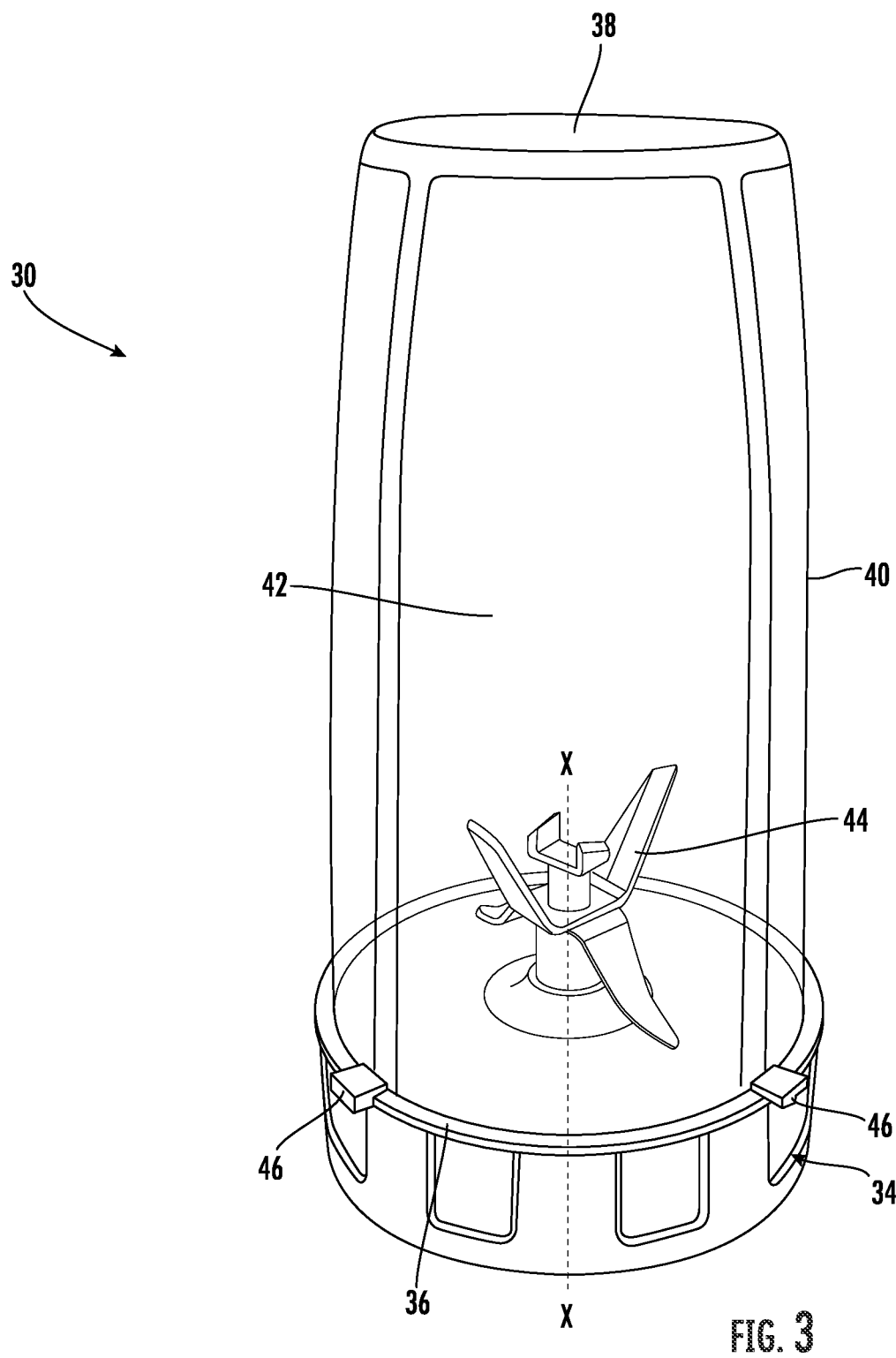
FIG. 3 is a perspective view of a food processing system having a first attachment.

One or more attachments 30 varying in size and/or functionality may be configured for use with the base 22. An example of an attachment is illustrated in more detail in FIG. 3. In the illustrated, non-limiting embodiment, the attachment 30 is an inverted jar or container 32 having a rotatable blade assembly 34 coupled thereto. As shown, the container 32 typically includes a first open end 36, a second closed end 38, and one or more sidewalls 40 extending between the first end 36 and the second end 38. The sidewalls 40 in combination with one or more of the ends 36, 38 of the container 32 define a hollow interior processing chamber 42 of the container 32. In embodiments where the attachment 30 is a personal blending container that has a first configuration when separated from the base 22 and a second inverted configuration when coupled to the base 22, a rotatable blade assembly 34 is configured to removably couple to the first open end 36 of the container 32 to seal the processing chamber 42. The container 32 and blade assembly 34 may be threadably coupled together; however, it should be understood that other mechanisms for removably connecting the container 32 and the blade assembly 34 are also contemplated herein.

The rotatable blade assembly 34 is receivable within or about the base 22 of the food processing system 20. A driven coupler 35 (see FIG. 4) associated with the at least one blade 44 is positioned adjacent an external surface of the rotatable drive assembly 34, outside of the processing chamber 42. The at least one drive coupler 26 is configured to engage the driven coupler to rotate the at least one blade 44 about an axis X to process the food products located within the processing chamber 42 of the attachment 30. It should be understood that the attachment 30 including an inverted container 32 and a rotatable blade assembly 34 is intended as an example only, and that other attachments, are also contemplated herein.

In embodiments where the attachment 30 includes an inverted container 32, the attachment 30 may include one or more contact members 46, such as tabs for example, positioned about the periphery of the attachment 30. Although four contact members 46 are generally illustrated in the FIGS., any number of contact members 46 is within the scope of the disclosure. In embodiments where the attachment 30 includes an inverted container 32 and a blade assembly 34, the contact members 46 may extend outwardly from the container 32, the blade assembly 34, or both.

The contact members 46 of the attachment 30 are configured to cooperate with a mounting area 48 of the base 22 to couple the attachment 30 to the base 22. As shown, the mounting area 48 includes one or more receiving slots 50 within which each of the plurality of contact members 46 of the attachment 30 is receivable. The attachment 30 may be configured to slidably connect to the base 22 of the food processing system 20. Alternatively or in addition, the attachment 30 may be configured to rotatably connect to the base 22 such that the attachment 30 is locked relative to the base 22. However, it should be understood that any suitable mechanism for coupling the attachment to the base 22 is within the scope of the disclosure.

Figure 4:
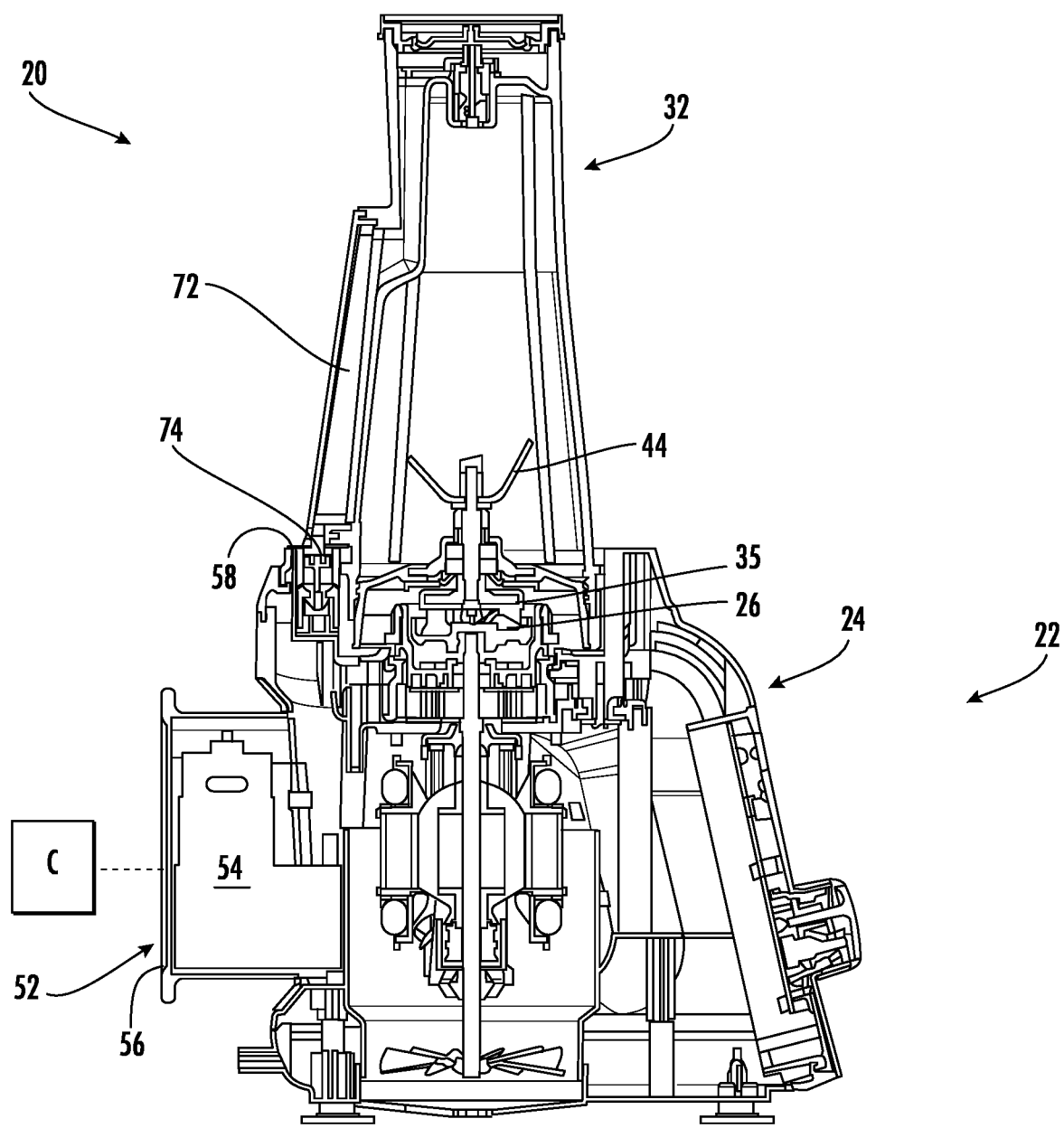
FIG. 4 is a cross-sectional view of a food processing system according to an embodiment.

With reference now to FIG. 4, in an embodiment, the food processing system 20 is operable to perform a vacuum operation. Accordingly, the base 22 of the food processing system 20 may additionally include a vacuum system 52 having a mechanism 54 capable of drawing a vacuum, such as a vacuum pump for example. However, any mechanism capable of drawing a vacuum is contemplated herein. At least one attachment 30 configured for use with the base 22 is operably coupled to the vacuum mechanism 54 when the attachment 30 is connected with the base 22. In the illustrated, non-limiting embodiment, the vacuum mechanism 54 is arranged at a side 56 of the base 22, such as at the rear thereof, to allow one or more attachments 30 having varying configurations to easily couple to the vacuum mechanism 54. The vacuum mechanism 54 may be operably coupled to a controller, illustrated schematically at C, such that the vacuum mechanism 54 is operated by the controller C in response to actuation of one or more inputs 29 of the user interface 28.

In an embodiment, the container 32 is a vacuum container suitable for performing a vacuum operation of the food processing system 20. In such embodiments, best shown in FIGS. 5 and 6, the container 32 includes an interior wall 60 disposed at a position located between the first end 36 and the second end 38 of the container 32. In the illustrated, non-limiting embodiment, the interior wall 60 is offset from the second end 38 of the container 32 and seals an end of the processing chamber 42. A cover 62 is vertically offset from the interior wall 60, at a position between the interior wall 60 and the second end 38 of the container 32. The cover 62 may be permanently affixed to the container 32, or alternatively, may be able to move, for example pivot, relative to the interior wall 60 between a closed position and an open position. In an embodiment, the cover 62 extends from a protrusion 64 located at a central portion of the interior wall 60 to an interior surface 66 of the sidewall 40. A gasket or seal 68 may be mounted to the cover 62 and configured to contact the interior surface 66 of the sidewall 40 and the interior wall 60 to form an air-tight seal there between. Together the interior wall 60, adjacent sidewall 40, and cover 62 cooperate to define a vacuum chamber 70 sealed from the ambient atmosphere and separate from the processing chamber 42.

Figure 5:
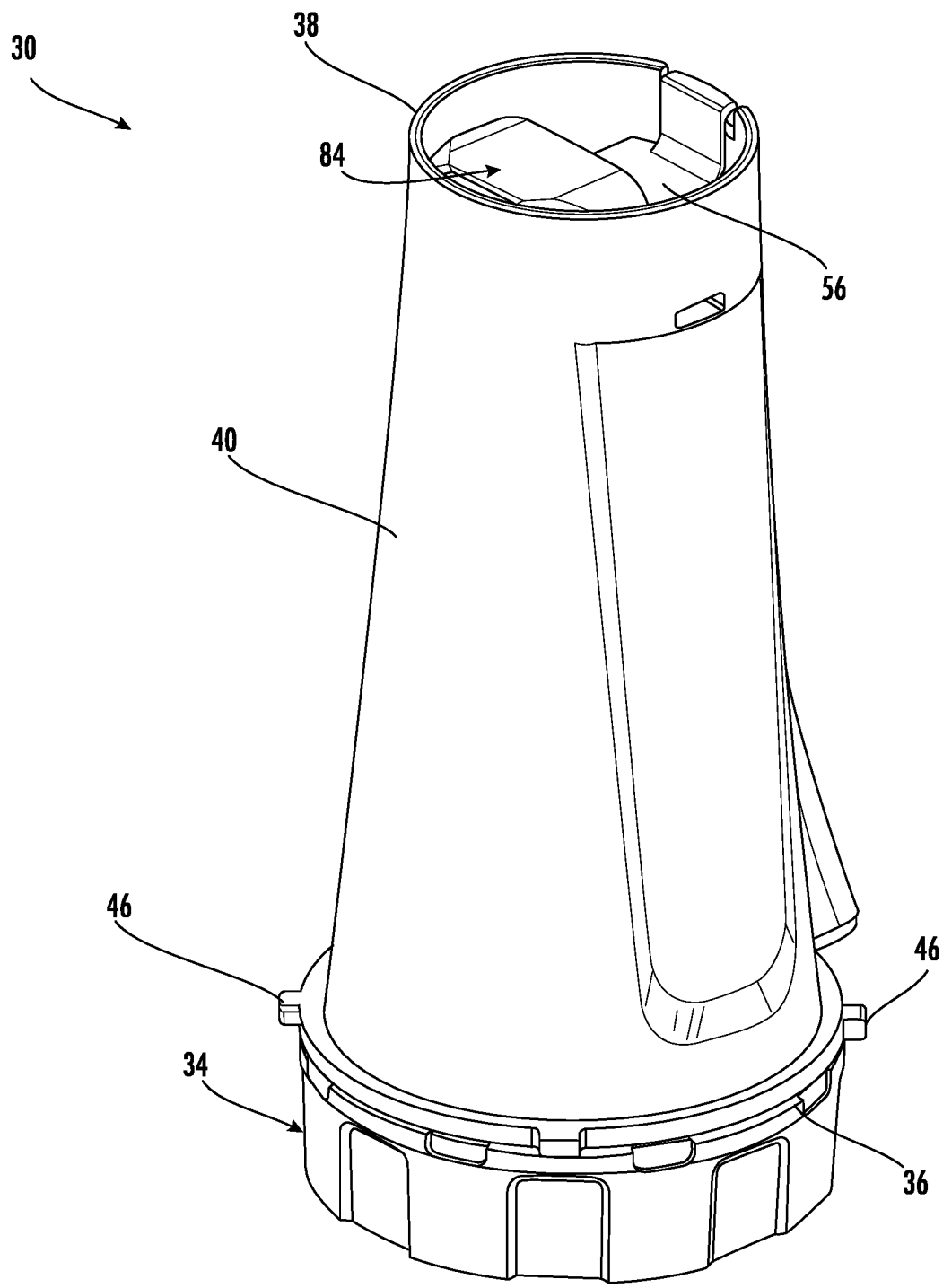
FIG. 5 is a perspective view of an attachment suitable for use with the food processing system according to an embodiment.
Figure 5A:
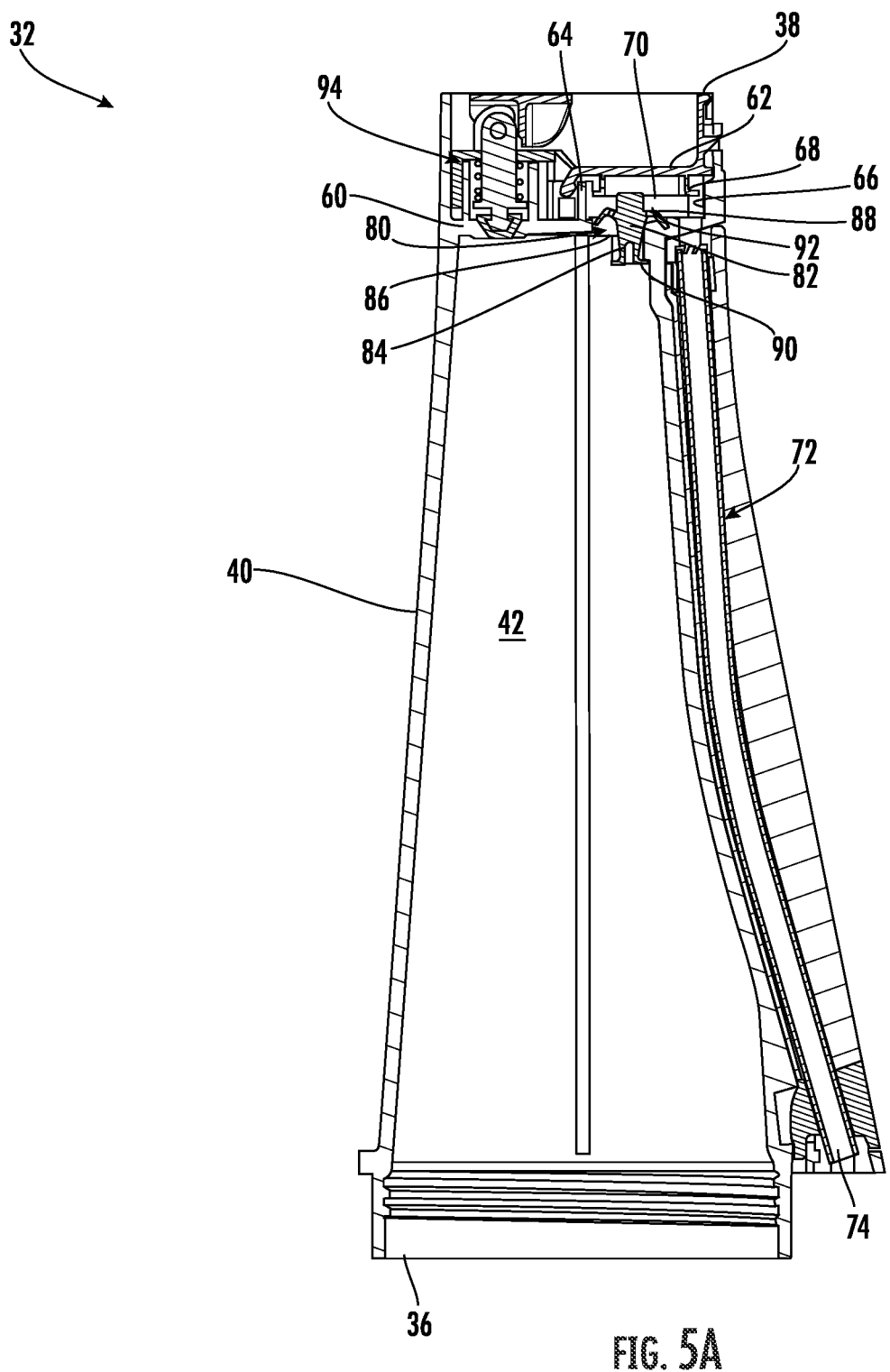
FIG. 5A is a cross-sectional view of a portion of the attachment of FIG. 5 according to an embodiment.

The container 32 additionally includes a vacuum passage or conduit 72 configured to fluidly connect the vacuum mechanism 54 and the vacuum chamber 70 when the attachment 30 is coupled to the base 22. The vacuum passage 72 may have a generally linear configuration as shown in FIG. 5, or alternatively, may have one or more bends or angles formed therein. Because the vacuum mechanism 54 is located at a side 56 of the base 22, a first end 74 of the vacuum passage 72 configured to abut with a surface of the base 22 to fluidly couple to the vacuum mechanism 54 is similarly located adjacent a corresponding side of the container 32. In an embodiment, a portion of the vacuum system 52 is arranged adjacent an upper surface 58 of the base 22. As a result, the first end 74 of the vacuum passage 72 may be vertically offset from the first end 36 of the container 32. However, embodiments where the first end 74 of the vacuum passage 72 is aligned with the first end 36 of the container 32 are also considered herein.

Figure 6:
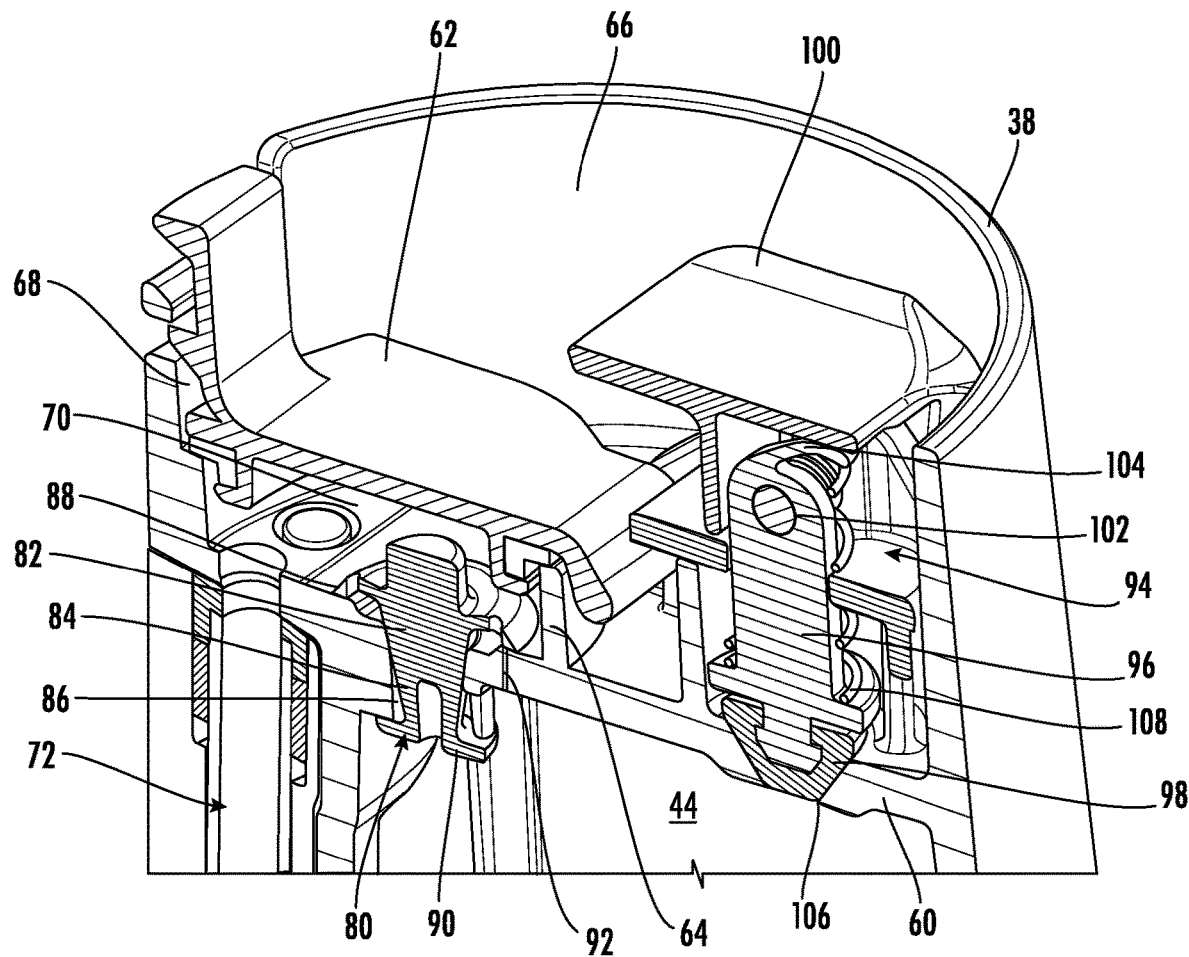
FIG. 6 is a perspective view of portion of an attachment suitable for use with the food processing system according to an embodiment.

The vacuum attachment 30 includes a vacuum sealing assembly 80 located within the vacuum chamber 70, at an interface between the processing chamber 42 and the vacuum chamber 70. As best shown in FIG. 6, an example of a vacuum sealing assembly 80 is illustrated in more detail. More specifically, the vacuum sealing assembly 80 may be formed in the interior wall 60 that separates the processing chamber 42 from the vacuum chamber 70. By arranging the vacuum sealing assembly 80 at this position, the vacuum sealing assembly 80 is easily accessible by a user when the attachment 30 is coupled to the base 22 of the food processing system 20. However, in other embodiments, the vacuum sealing assembly 80 may be located at another location about the attachment 30.

The vacuum sealing assembly 80 includes an umbrella valve 82 having a valve stem 84 extending through a primary opening 86 formed in the interior wall 60, and a flange 88 extending generally perpendicular to the valve stem 84. As shown, one or more dimensions of the distal end 90 of the valve stem 84 are greater than the primary opening 86 to restrict movement of the umbrella valve 82 relative to the container 32. Via the engagement between the valve stem 84 and the primary opening 86, a flow of fluid or food particles from the interior processing chamber 42 of the container 32 through the primary opening 86 is restricted. The flange 88 of the umbrella valve 82 is sized such that a portion of the flange 88, such as near the periphery of the flange 88 for example, is in overlapping arrangement with the at least one secondary opening 92 formed in the interior wall 60. Accordingly, under normal conditions, the flange 88 seals the at least one secondary opening 92 to prevent a flow of fluid and/or food particles there through.

During a vacuum operation, when either attachment is mounted to the base 22 and the vacuum passage 72 is operably coupled to the vacuum system 52, the vacuum mechanism 54 generates a negative pressure which is applied to the exposed surface of the umbrella valve 82. The negative pressure generated will cause the peripheral portion of the flange 88 to separate from the secondary opening 92 just enough to allow air within the processing chamber 42 to be drawn there through. As soon as operation of the vacuum mechanism 54 ceases and the negative pressure is removed, the peripheral portion of the flange 88 will bias back into its original position to seal the secondary opening 92. This bias may be the result of the resilient material, such as silicone for example, from which the umbrella valve 82 is formed.

Alternatively, a biasing mechanism may be used to facilitate movement of the flange 88 back into a sealing position. A vacuum operation may be performed after food has been disposed within the processing chamber 42 but prior to performing a food processing operation. In another embodiment, a vacuum operation is initiated to draw a vacuum within the processing chamber 42 after performance of a food processing operation has been performed. Forming a vacuum after a blending operation may be used to increase the shelf life or storage of the food products within the attachment 30.

The vacuum attachment 30 additionally includes a release mechanism 94 operable to vent the processing chamber 42 of the container 32 to ambient, thereby breaking the vacuum formed therein. The release mechanism 94 is similarly mounted at a location of the attachment 30 that is easily accessible by a user. As shown, the release mechanism 94 is located remotely from and is not connected to the vacuum sealing assembly 80. However, it should be understood that embodiments where the release mechanism 94 is directly or indirectly coupled to the vacuum sealing assembly 80 are also within the scope of the disclosure. With respect to the inverted vacuum jar, the release mechanism 94 is mounted at the exposed second end 38 of the container 32.

In the illustrated, non-limiting embodiment, the release mechanism 94 includes a connector 96 having a sealing member 98. The release mechanism 49 additionally includes an actuator 100 pivotally coupled to the connector 96 via a pin 102 defining a pivot axis of the actuator 100. In an embodiment, a camming lever 104 extends from the connector 96 toward the actuator 100. When the release mechanism 94 is in an unactuated state, the sealing member 98 is engaged with an adjacent opening 106 fluidly connected to the processing chamber 42. A biasing member 108, such as a coil spring for example, may be coupled to the connector 96 to bias the sealing member 98 into engagement with the opening 106 to form an air tight and liquid tight seal. To actuate the release mechanism 94, the actuator 100 is pivoted about the axis of pin 102. This movement overcomes the bias of the biasing member 108 and also applies a force to the camming lever 104 of the connector 96, thereby causing the connector 96 and sealing member 98 to move vertically, and out of engagement with the opening 106. Upon removal of the force from the actuator 100, the biasing member 108 will bias the release mechanism 94 back into its original position, thereby sealing the opening 106.

After a vacuum has been generated within the processing chamber 42 of the container 32, it is difficult, if not impossible to remove the blade assembly 34 and access the food product within the processing chamber 42 as a result of the forces acting thereon. Accordingly, a user should first break the vacuum within the container 32 by operating the release mechanism 94 prior to accessing the contents within the processing chamber 42 of the container 32.

A container 32 having a vacuum sealing assembly 80 as illustrated and described herein when used in conjunction with a vacuum mechanism 54 prior to a food processing operation may provide a food product having increased vitamin retention, specifically vitamin C. Exposure to oxygen within during the blending process may cause the ingredients within the container 32 to degrade. By removing the oxygen from the container 32, the overall degradation of the nutritional properties of the ingredients being processes is reduced. The vacuum attachment 30 illustrated and described herein is intended as an example only, and it should be understood than any vacuum attachment suitable for use with the base 22 is within the scope of the disclosure.

Figure 7:
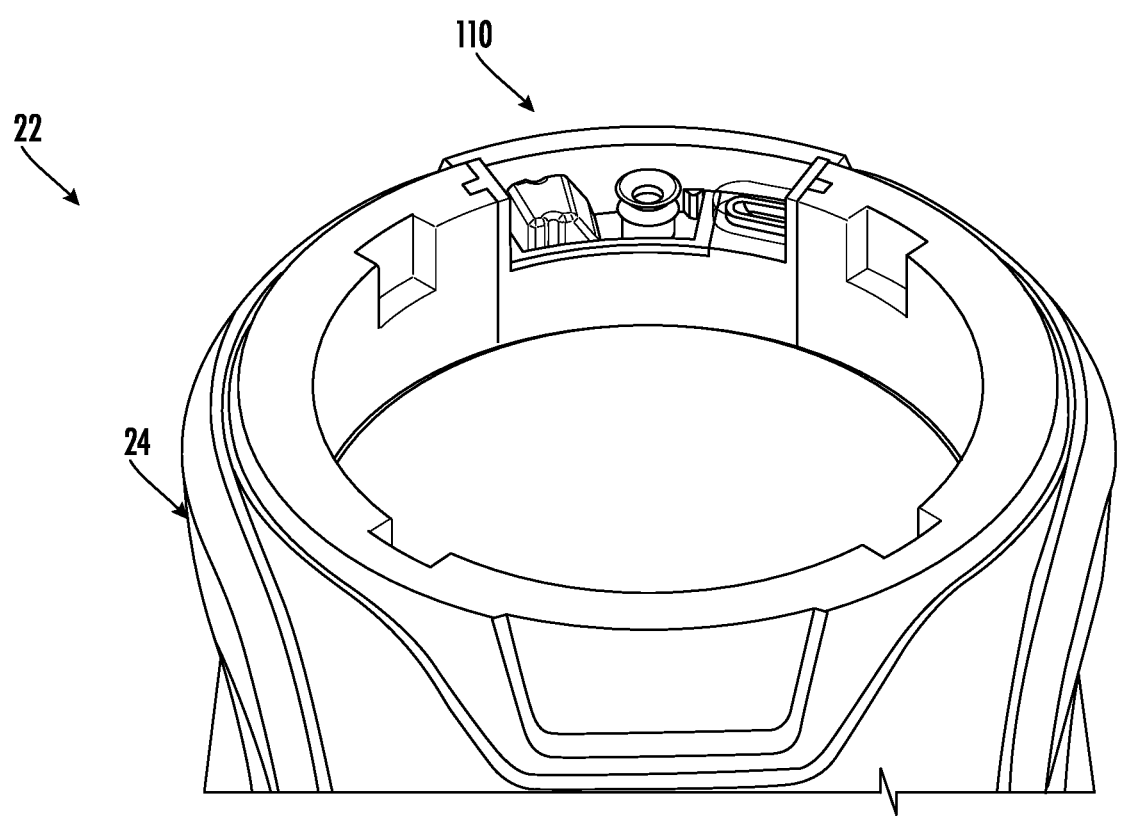
FIG. 7 is a perspective view of a food processing base according to an embodiment.
Figure 8:
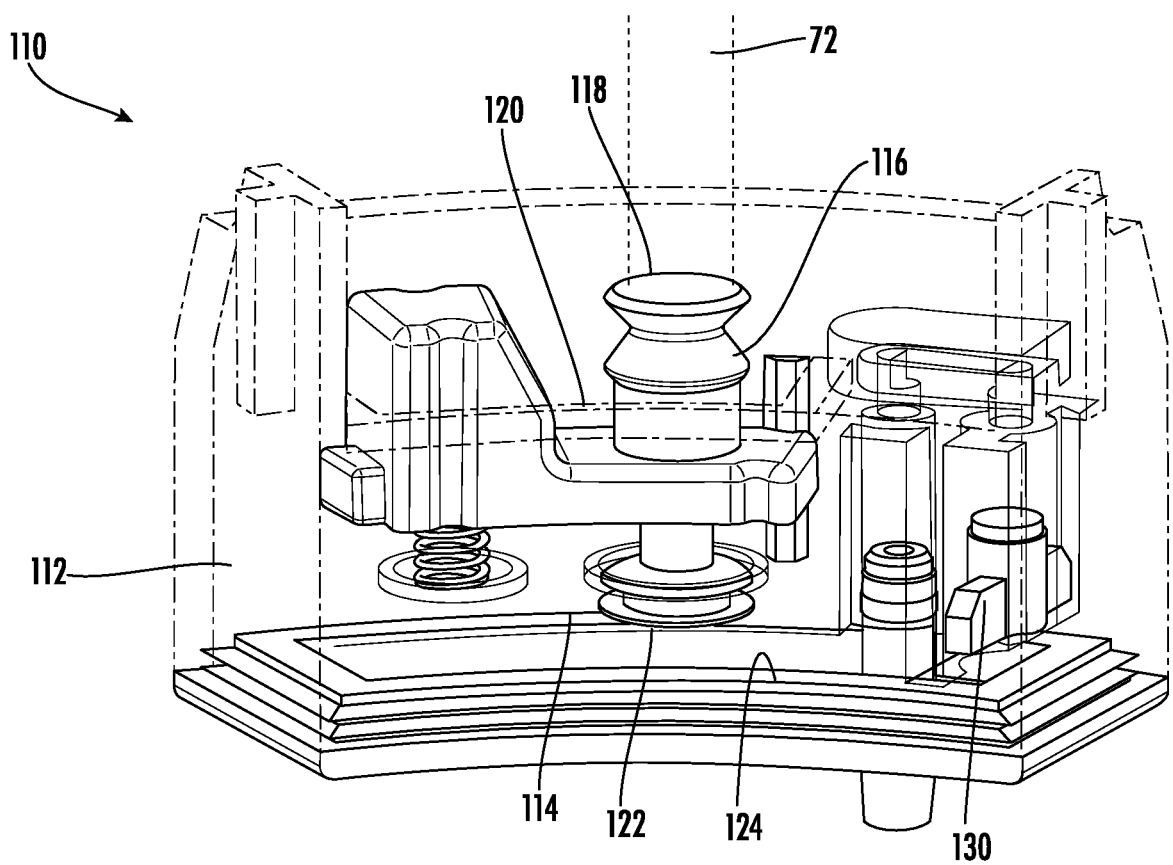
FIG. 8 is a perspective view of a reservoir assembly of a food processing base according to an embodiment.

With reference now to FIG. 7, the vacuum system 52 of the base 22 is illustrated in more detail. As previously described, the vacuum system 52 includes a vacuum mechanism 54 operable to generate a negative pressure to draw air out of the processing chamber 42 of an attachment 30 connected to the base 22. The vacuum system 52 additionally includes a reservoir assembly 110 disposed between the vacuum mechanism 54 and the vacuum passage 72 of the container 32. In an embodiment, the reservoir assembly 110 is removably mounted at an upper surface 58 of the base 22. Accordingly, when an attachment 30 is installed onto the base 22, the first end 74 of the vacuum passage 72 is connected directly to the reservoir assembly 110.

Referring now to FIGS. 8-12, an example of the reservoir assembly 110 is illustrated in more detail. As shown, the reservoir assembly 110 includes a housing 112 having a generally hollow interior 114. An inlet pipe 116, for example arranged at the center of the housing 112, provides a fluid inlet into the hollow interior 114 of the housing 112. The hollow interior 114 of the housing 112 defines a reservoir in which a fluid other than air may collect. A first end 118 of the inlet pipe 116 is extending beyond the upper surface 120 of the housing 112 is configured to connect to the vacuum passage 72 of the container 32, and the second, opposite end 122 of the inlet pipe 116 is offset from a lower surface 124 of the housing 112.

In the illustrated, non-limiting embodiment of FIGS. 8-12, a valve 130, such as a float valve for example, is located within the hollow interior 114 of the housing 112. The valve 130 is movable between a first position (see FIG. 8), and a second position (see FIG. 11). In the illustrated, non-limiting embodiment, the valve 130 is configured to translate vertically along an axis from a first position, generally near the lower surface 124 of the housing 112 for example, to a position near an upper surface 126 of the hollow interior 114. However, embodiments where the valve 130 is configured to move in another direction, such as horizontally or diagonally for example, are also within the scope of the disclosure. In an embodiment, the valve 130 is sized such that undesired movement of the float valve 130, such as rotation thereof relative to the housing 112, is prevented as the valve 130 moves between the first and second positions. Alternatively, the float valve 130 may include a valve housing 132 (FIG. 10) that defines a path or float channel along which the float valve 130 may move between the first and second positions. In yet another embodiment, the float valve 130 may be designed such that a specific orientation of the float valve 130 is not required for proper operation of the float valve 130. In such embodiments, the float valve 130 may be generally spherical in shape.

Figure 9:
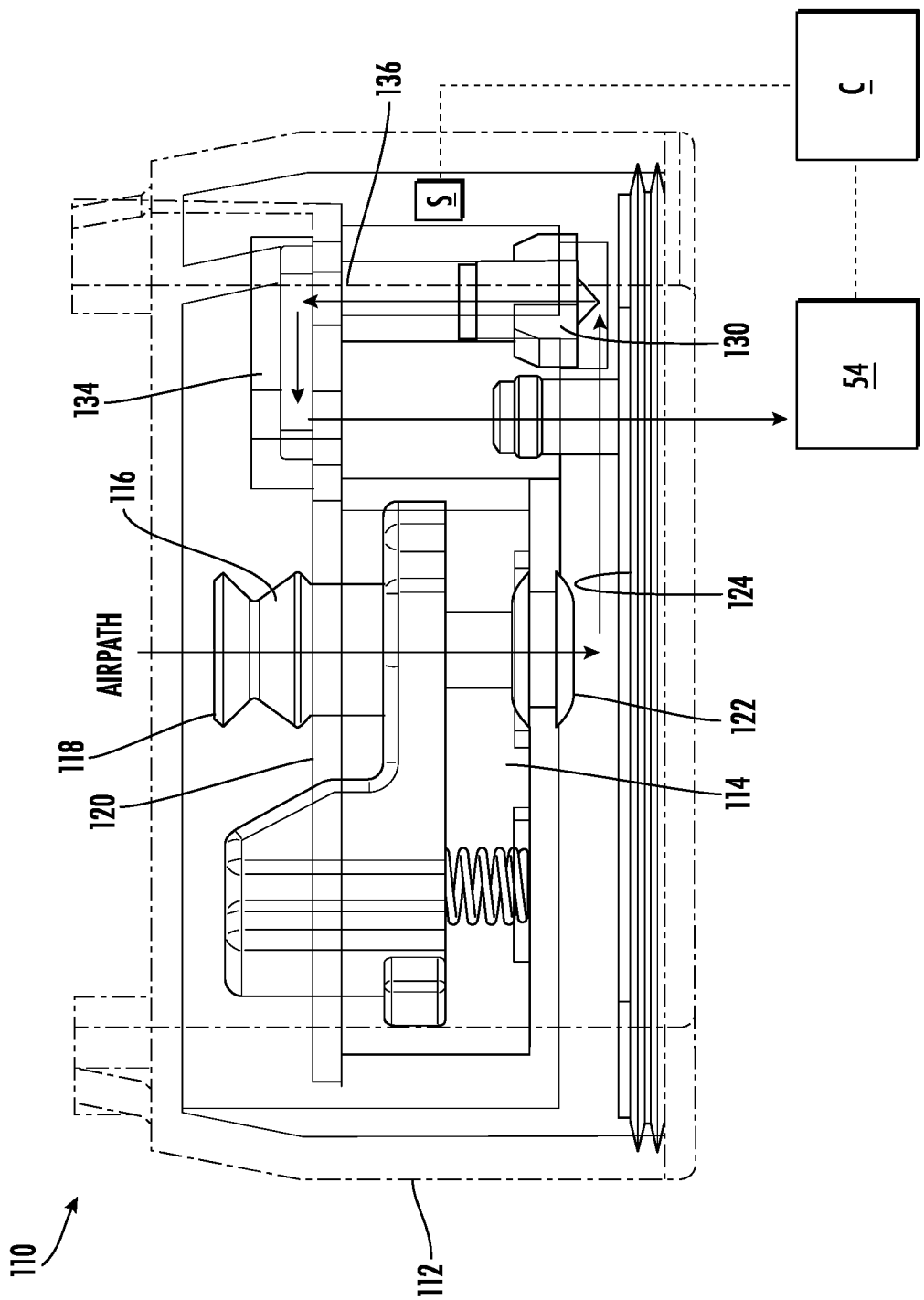
FIG. 9 is another perspective view of a reservoir assembly having a valve in a first position according to an embodiment.
Figure 10:
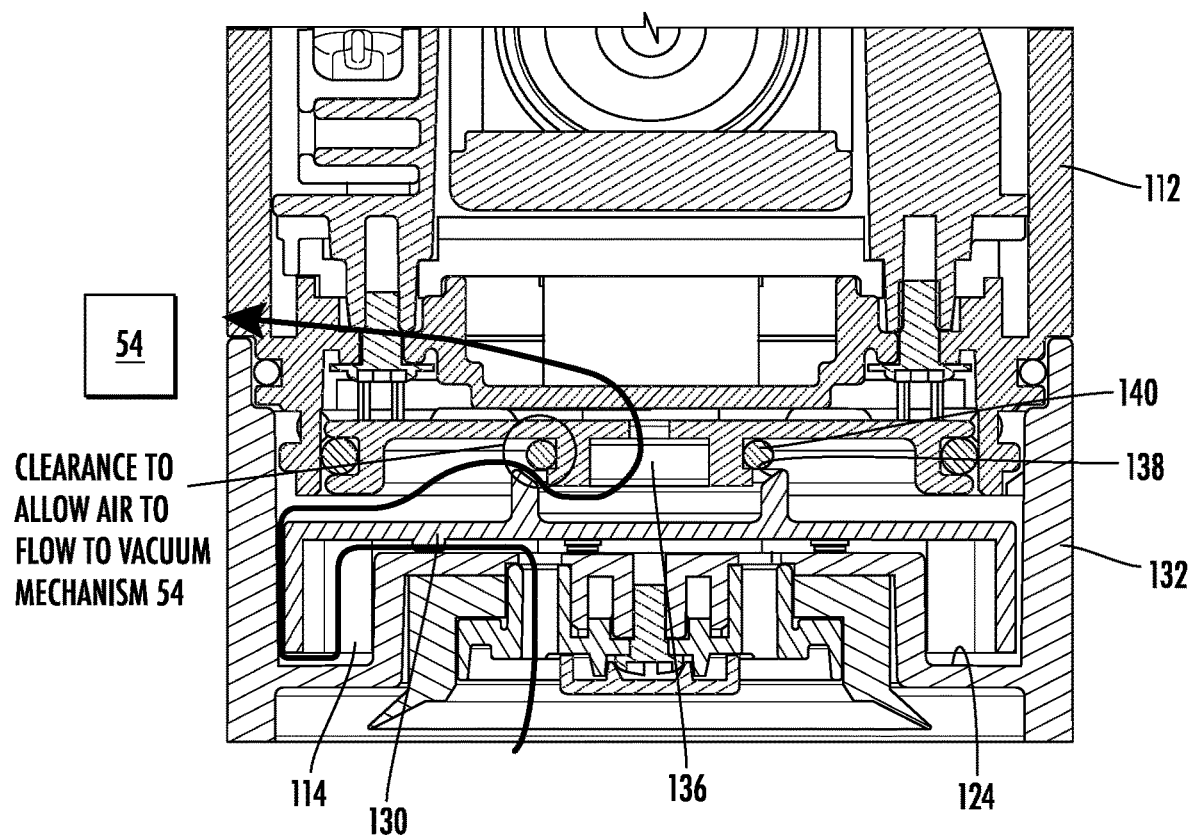
FIG. 10 is a cross-sectional view of the reservoir assembly having a valve in a first position according to an embodiment.
Figure 11:
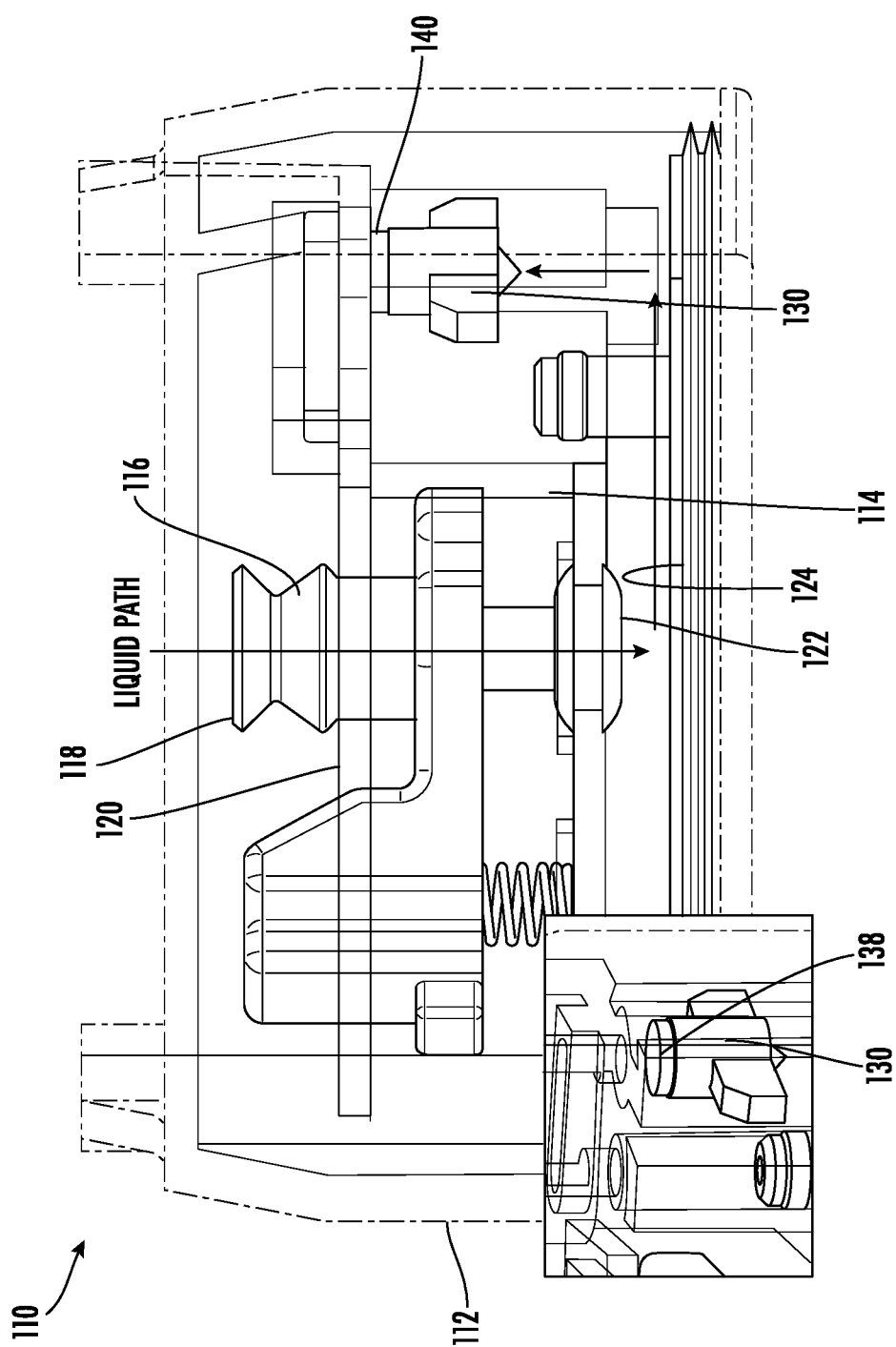
FIG. 11 is another perspective view of a reservoir assembly having a valve in a second position according to an embodiment.
Figure 12:
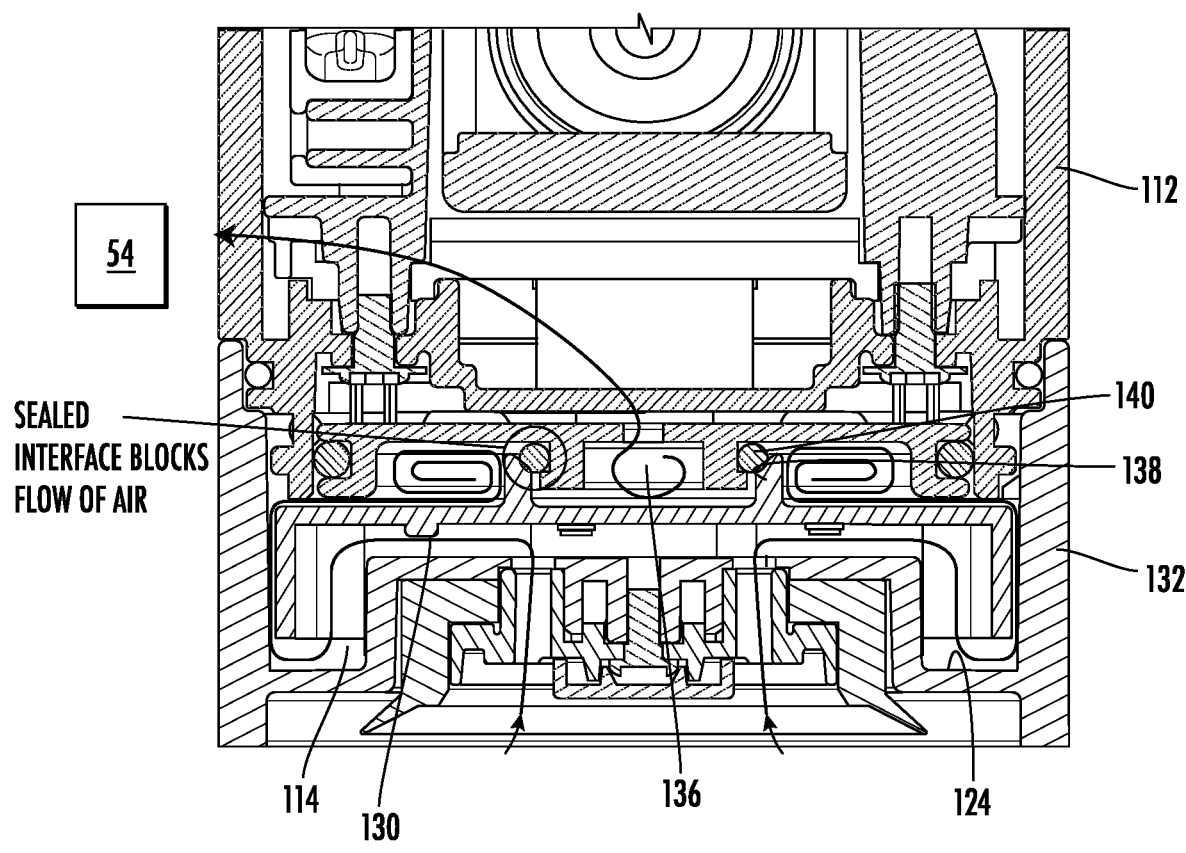
FIG. 12 is a cross-sectional view of the reservoir assembly having a valve in a second position according to an embodiment.

The reservoir assembly 110 additionally includes a fluid flow path connecting the vacuum mechanism 54 to the inlet pipe 116 (best shown in FIG. 9). The fluid flow path may be defined in any suitable manner, such as via one or more channels or conduits 134 for example. In the illustrated, non-limiting embodiment, the at least one conduit 134 defines a circuitous, or non-linear fluid flow path, and an inlet 136 of the at least one conduit 134 is offset from the lower surface 124 of the housing 112, such as generally adjacent the upper surface 126 of the housing 112 for example, in alignment with the float valve 130.

If the processing chamber 42 of a container 32 attached to the base 22 is filled beyond a predetermined threshold, a portion of the contents of the processing chamber 42 may be drawn into the vacuum passage 72 during a vacuum operation. Because of the small size of the secondary opening 92 associated with the vacuum sealing assembly 80, the food drawn into the vacuum passage 72 is typically a liquid, or a slurry including processed food particles. To prevent this food from entering into the vacuum mechanism 54, the reservoir assembly 110 is arranged between the vacuum passage 72 of the container 32 and the vacuum mechanism 54.

An example of the path of the air drawn from the processing chamber 42 into the vacuum mechanism 54 is illustrated in FIG. 9. As shown, the air is provided to the first end 118 of the inlet pipe 116, which is coupled to the end 74 of the vacuum passage 72. The air flows through the inlet pipe 116 into the hollow interior 114 of the housing 112. When the float valve 130 is in the first position, or alternatively, in any position except the second position, the air is configured to flow around the float valve 130 and into an inlet 136 of the one or more conduits 134 defining the fluid flow path from the hollow interior 114 of the housing 112 to the vacuum mechanism 54.

During vacuum operations where liquid or food particles are entrained within the air flow provided to the reservoir assembly 110, the particulate (i.e. liquid and food particles) will accumulate within the hollow interior 114 or reservoir, adjacent the lower surface 124 of the housing 112. The reservoir assembly 110 is configured to collect food contents while still allowing air necessary to operate the vacuum mechanism 54 to flow there through. The weight of the particulate prevents the particulate from moving with the air flow into the inlet 136 of the fluid flow path arranged near the upper surface 126 of the hollow interior 114. Accordingly, over time, the particulate disposed within the hollow interior 114 will accumulate.

During operation of the vacuum system 52, in a dry state, such as when the reservoir is absent any liquid, the weight of the float valve 130 will maintain the float valve in a first position, generally near the bottom 124 of the reservoir 114. During operation of the vacuum system in a wet state, such as when liquid is introduced into the reservoir, the float valve 130 will move within the housing 112 between the first position and the second position. In an embodiment, the position of the float valve 130 is directly dependent on the volume of particulate within the hollow interior 114. For example, in an embodiment, the liquid introduced into the reservoir 114 forms a meniscus with the internal walls of the housing 112, creating a pressure adjacent the float valve 130, such as within the float channel for example. The meniscus and pressure may cause the float valve 130 to move from the first position to the second position, to seal the inlet 136. Alternatively or in addition, as liquid enters the reservoir 114, the inlet area at the inlet 136 is reduced. This reduction in inlet area causes an increase in air velocity that may be sufficient to move the float valve 130 within the housing 112.

When the liquid and/or food particulate accumulated within the hollow interior 114 reaches a maximum allowable volume, the float valve 130 is located at the second position to block the inlet of the fluid flow path to the vacuum mechanism 54. In an embodiment, when the float valve 130 is in the second position, a mating surface 138 of the float valve 130 sealingly engages with a corresponding portion of the one or more conduits 134, such as a gasket or seal 140, thereby blocking the inlet 136 to the fluid flow path defined by the conduits 134. As a result, no air will be able to flow to the vacuum mechanism 54.

When an airflow to the vacuum mechanism 54 falls below a minimum threshold, such as when the float valve 130 is in the second position, the vacuum mechanism 54 may be configured to automatically shut off to avoid burnout. In an embodiment, the vacuum system 52 includes a sensor S separate from the vacuum mechanism 54 for detecting when the float valve 130 is in the second position, and/or when no air is provided to the vacuum mechanism 54 during operation of the vacuum mechanism 54. Upon determining that either condition is present, the controller C, operably coupled to the sensor and the vacuum mechanism 54 may de-energize the vacuum mechanism 54, such as by opening a switch formed in a power circuit thereof.

Figure 13:
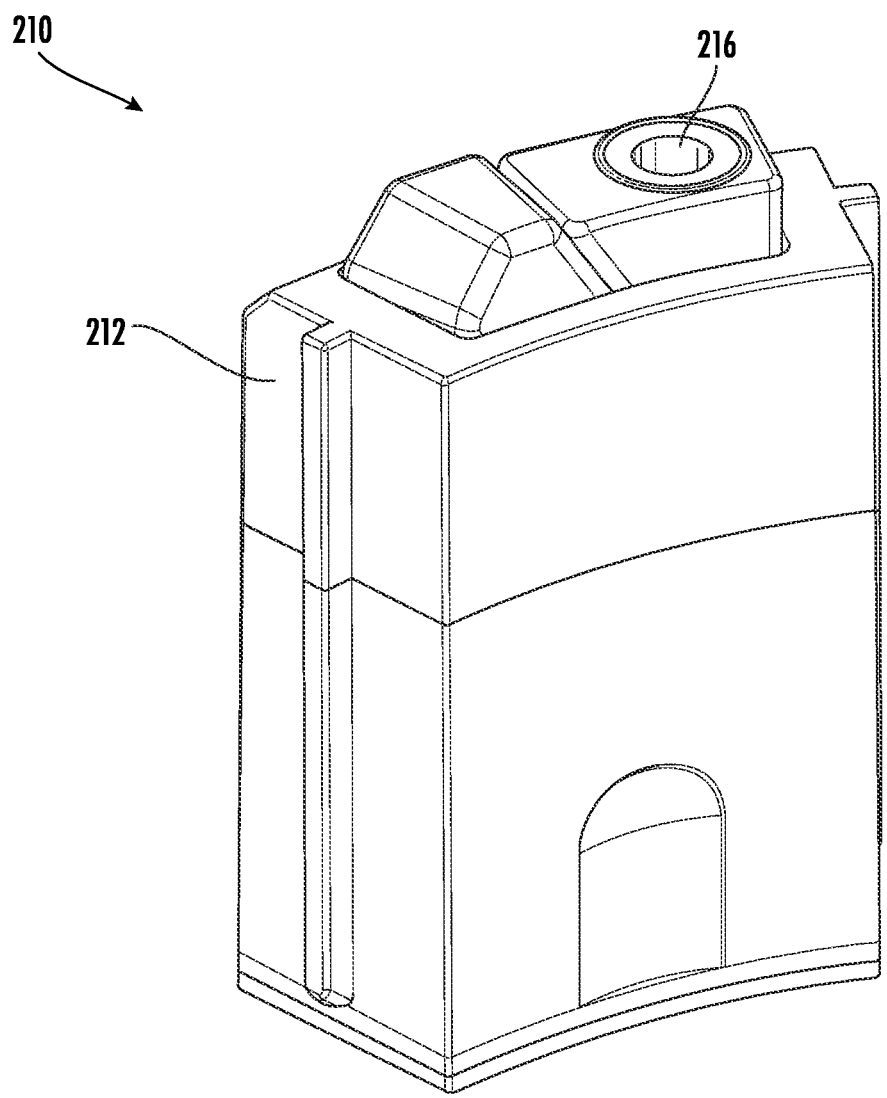
FIG. 13 is a perspective view of a reservoir assembly according to another embodiment.
Figure 14:
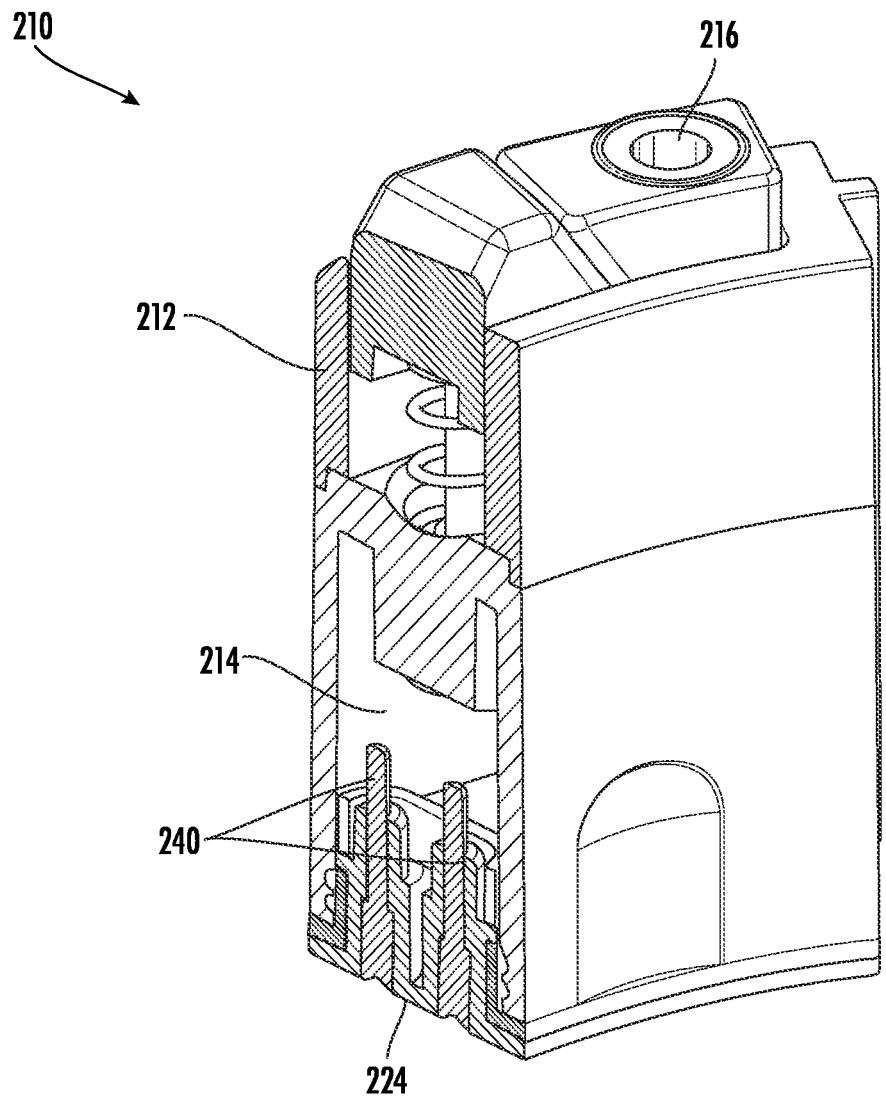
FIG. 14 is a partial cross-sectional view of the reservoir assembly of FIG. 13 according to an embodiment.
Figure 15:
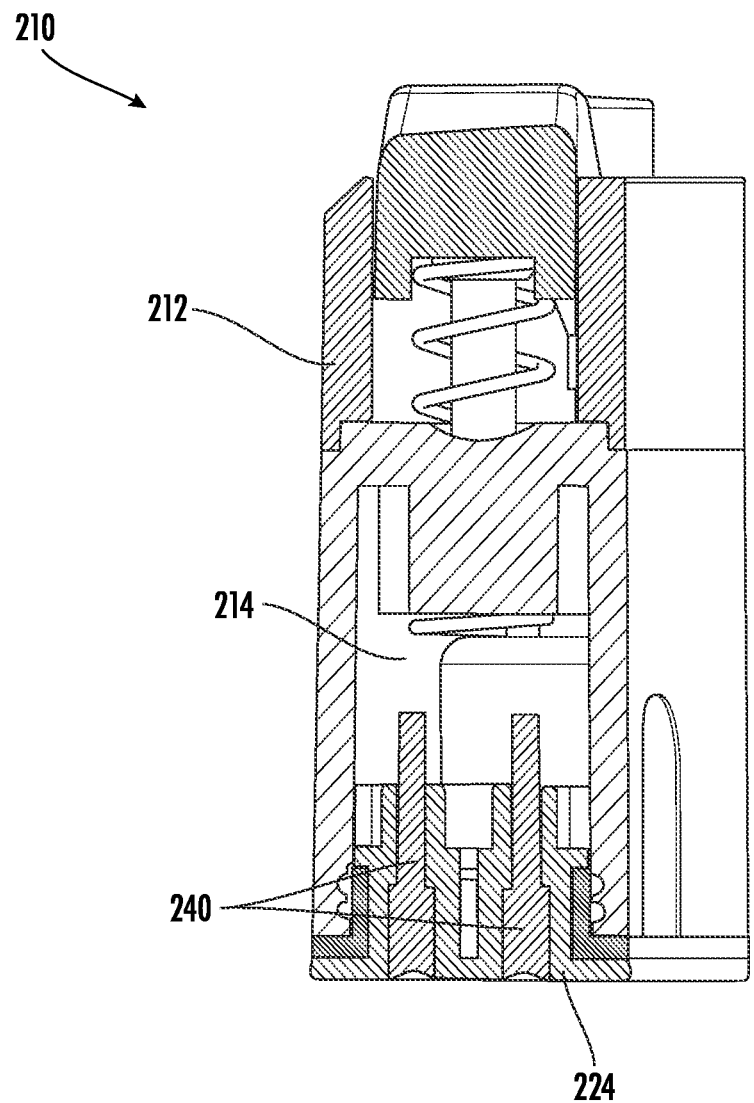
FIG. 15 is a plan view of the reservoir assembly of FIG. 14 according to an embodiment.

With reference now to FIGS. 13-15, another embodiment of a reservoir assembly 210 is illustrated. Similar to the previous embodiment, the reservoir assembly 210 includes a housing 212 having a generally hollow interior 214 (best shown in FIGS. 14 and 15). An inlet pipe or conduit 216, extending through an upper surface of the housing 212, provides a fluid inlet into the hollow interior 214 of the housing 212. The hollow interior 214 of the housing 212 defines a reservoir in which a fluid other than air may collect. In the illustrated, non-limiting embodiment, the reservoir assembly 210 additionally includes a plurality of terminals or contactors 240 that extend into the reservoir. The terminals 240 are separated from one another by a distance. Although the terminals 240 are illustrated as being mounted adjacent a bottom surface 224 of the housing 212, embodiments where the terminals 240 are located at another surface of the housing 212, such as one or more sides of the housing 212 for example, are also within the scope of the disclosure.

During operation of the vacuum system 52, in a dry state, the terminals extending into the reservoir are not electrically coupled or connected. During operation of the vacuum system in a wet state, however, liquid and/or particulate is gradually introduced into the reservoir 214. Once the liquid within the reservoir 214 reaches or exceeds a maximum allowable volume or threshold, the liquid will electrically connect two or more of the plurality of terminals 240. In an embodiment, the liquid exceeds the maximum allowable threshold once the two or more terminals 240 are submerged within the liquid. In response to the completion of the electrical circuit between the terminals 240, the controller C, operably coupled to the terminals 240 and the vacuum mechanism 54 may de-energize the vacuum mechanism 54, such as by opening a switch formed in a power circuit thereof.

Figure 16:
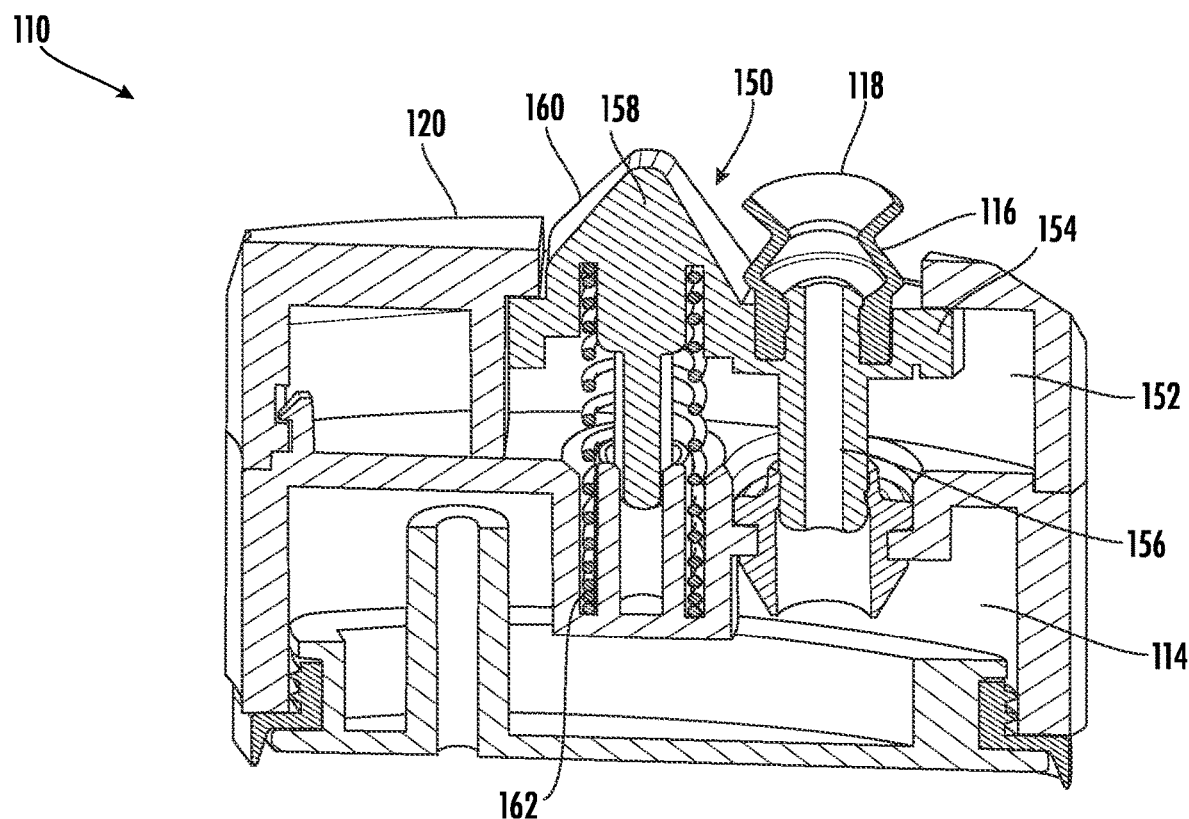
FIG. 16 is a cross-sectional view of a movement mechanism of a reservoir assembly according to an embodiment.
Figure 17:
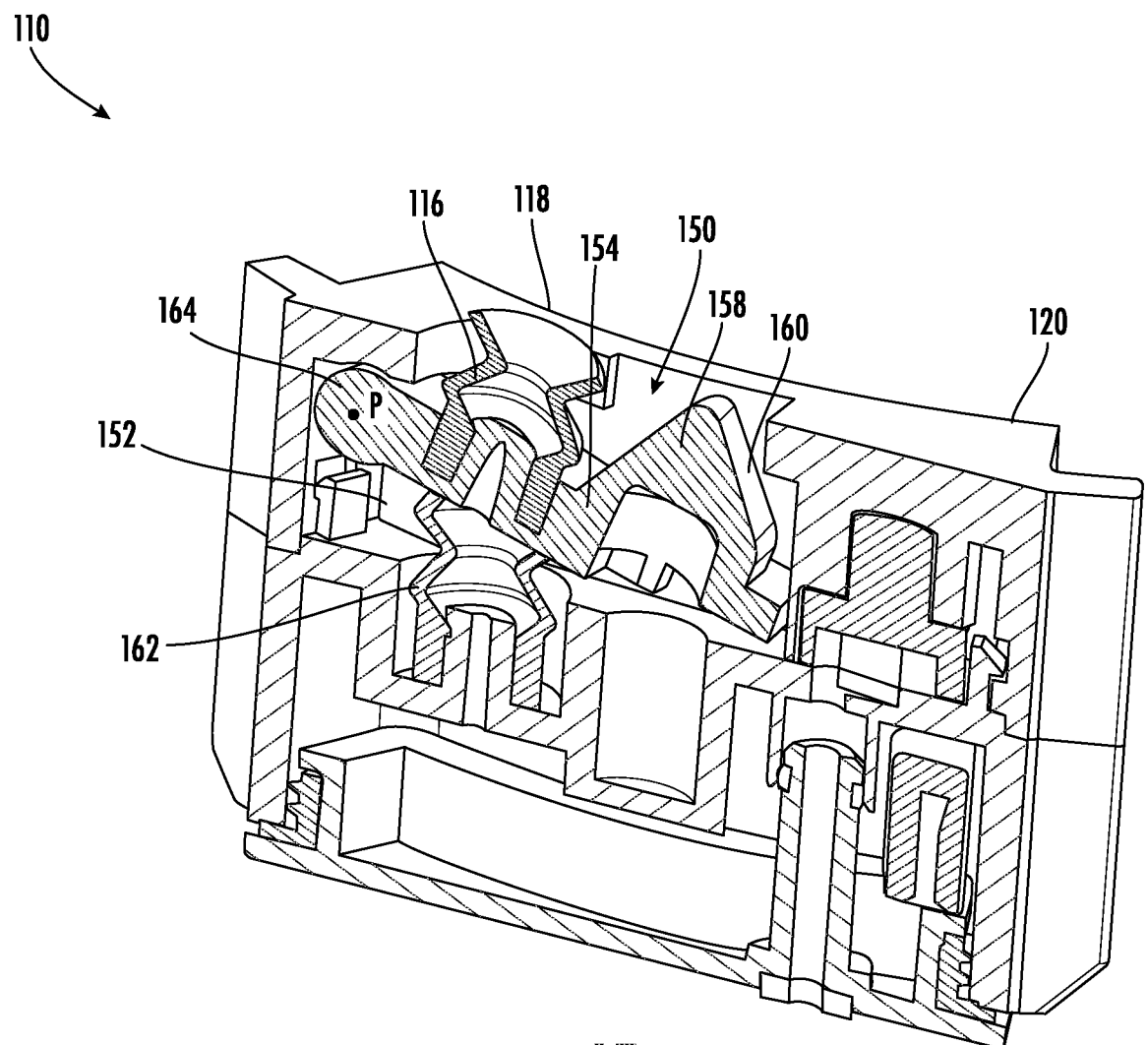
FIG. 17 is a cross-sectional view of a movement mechanism of a reservoir assembly according to another embodiment.
Figure 18:
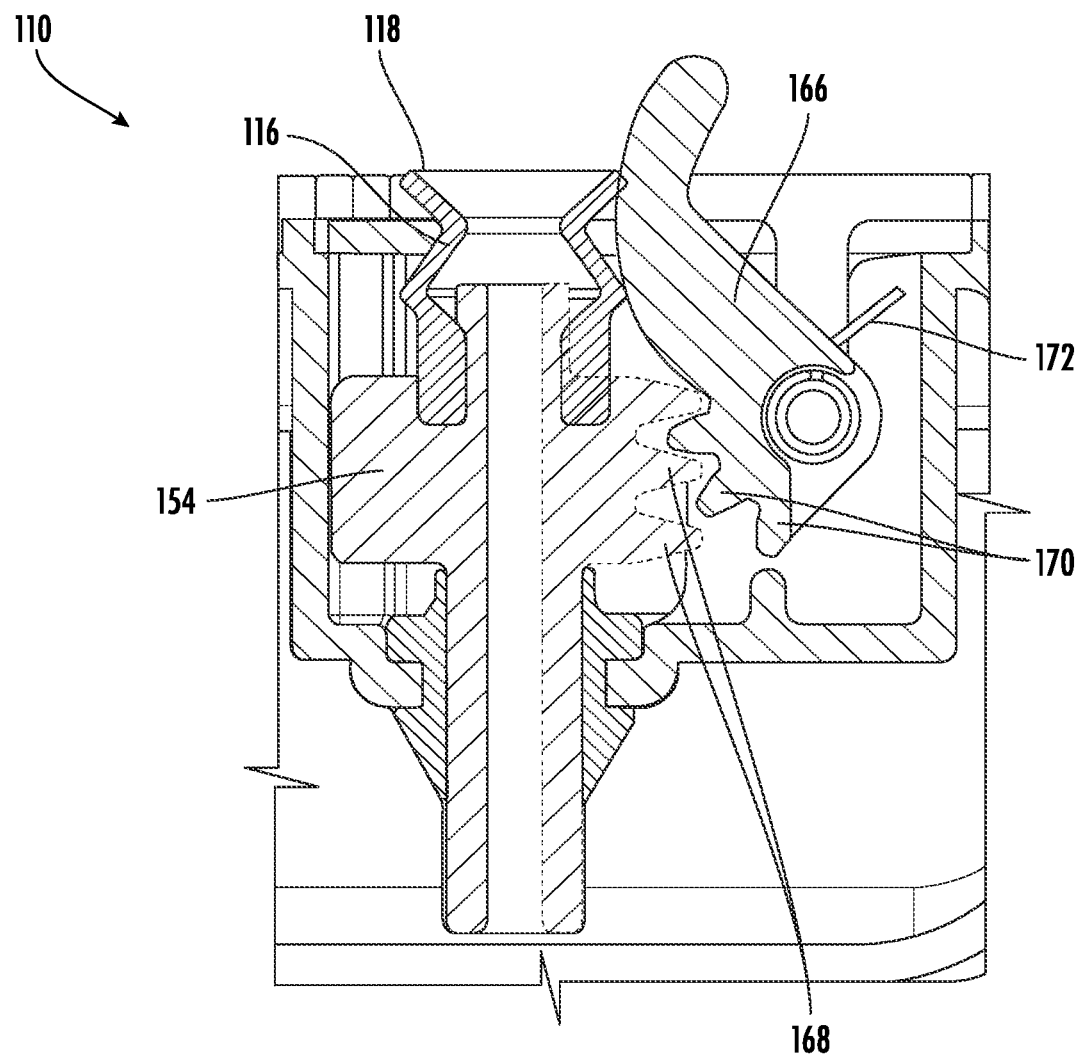
FIG. 18 is a cross-sectional view of a movement mechanism of a reservoir assembly according to an embodiment.

With reference now to FIGS. 16-19, the inlet pipe 116 exposed at the upper surface 120 of the housing 112 may be movable relative to the housing 112 to facilitate the installation of an attachment 30 and the formation of a connection or seal between the inlet pipe 116 and a respective portion of an attachment 30 when the attachment 30 is mounted to the base 22. Such movement allows the attachment 30 to be installed via both vertical and horizontal movement of the attachment 30 relative to the base 22. The inlet pipe 116 may be movable via any suitable mechanism and in any suitable direction via operation of a movement mechanism 150. In an embodiment, the inlet pipe 116 is translatable along an axis. As best shown in FIG. 16, a movement mechanism 150 is arranged within a compartment 152 formed in the housing 112 and includes a body 154 having a channel 156 in fluid communication with the hollow interior 114. The inlet pipe 116 is arranged adjacent an upper surface of the body 154 in alignment with the channel 156. The body 154 additionally includes a protrusion 158 that extends generally parallel to the inlet pipe 116. In the illustrated, non-limiting embodiment, the protrusion 158 includes at least one angled surface 160. A biasing mechanism 162, such as a coil spring for example, is positioned within the compartment 152 and is operably coupled to the body 154.

As a force is applied to the at least one angled surface 160 of the protrusion 158, such as by lateral movement of an attachment 30, the force will oppose the biasing force of the biasing mechanism 162 causing the body 154, and therefore the inlet pipe 116 to retract into the compartment 152 of the housing 112. In this retracted position, the inlet pipe 116 may be located vertically beneath the upper surface 120 of the housing 112. Once the attachment 30 is properly positioned relative to the base 22 and the reservoir assembly 110, the force is removed from the body 154. The biasing force of the biasing mechanism 162 will translate the body 154 upward and the inlet pipe 116 into sealing engagement with the end 74 of the vacuum passage 72 formed in the container 32. In an alternative embodiment, illustrated in FIG. 17, an end 164 of the body 154 is connected to the housing 112, and the body 154 of the movement mechanism 150 is configured to rotate about a pivot axis P in response to application of a force to the protrusion 158.

Figure 19:
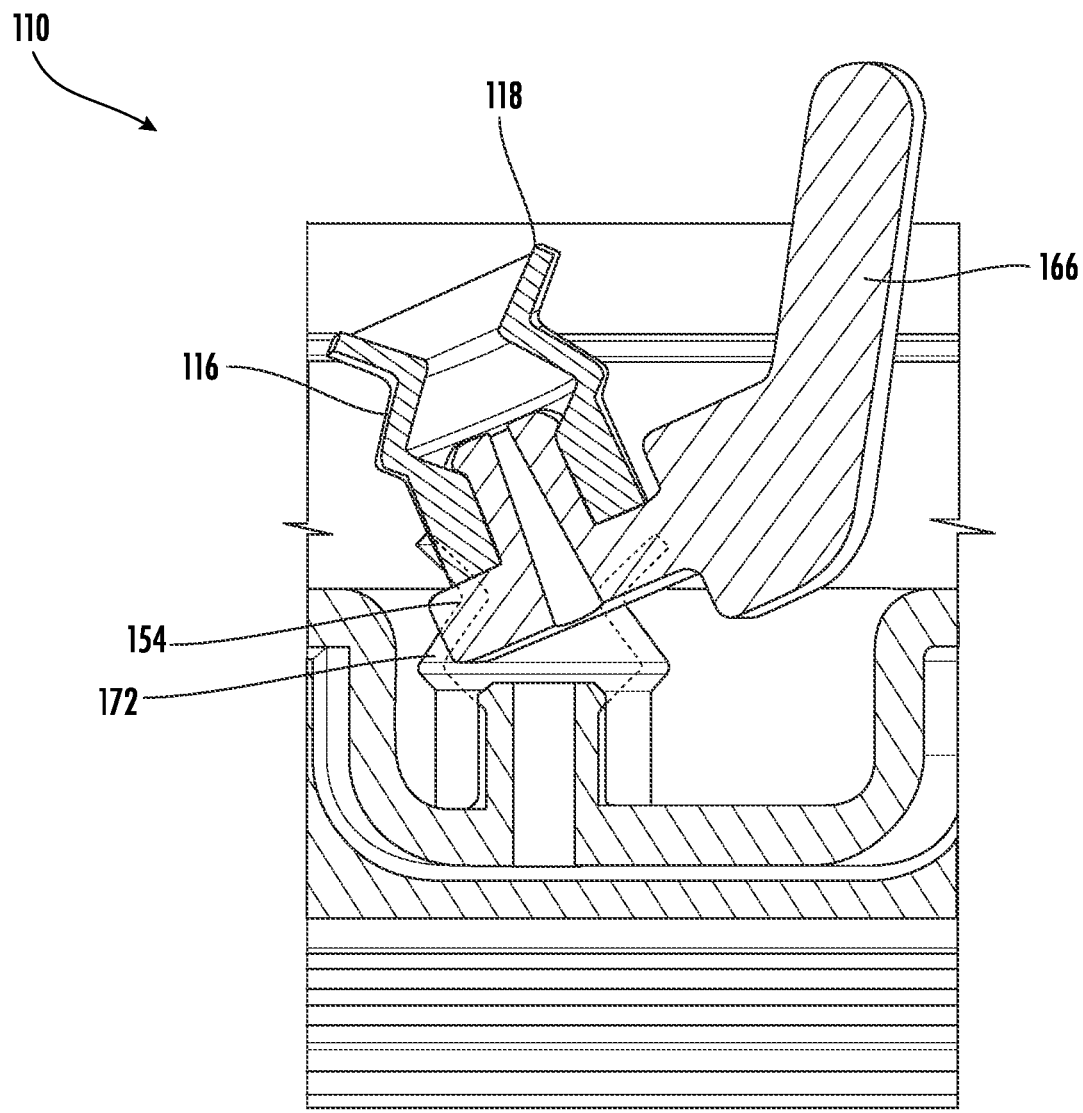
FIG. 19 is a cross-sectional view of a movement mechanism of a reservoir assembly according to an embodiment.

In another embodiment, the movement mechanism 150 includes a body 154 connected to a portion of the inlet pipe 116 and a lever 166 operably coupled to the body 154. In the illustrated, non-limiting embodiment of FIG. 18, the body 154 includes a first plurality of teeth 168 and the lever 166 includes a second plurality of teeth 170 arranged in meshing engagement with the first plurality of teeth 168. A biasing mechanism 172, such as a coil spring for example, is configured to bias the lever 166 into a default position. In the default position, the inlet pipe 116 may be disposed beneath the upper surface 120 of the housing 112. As the lever 166 is rotated about its pivot axis P, away from the inlet pipe 116, such as in response to a force applied by a container 32 for example, the engagement between the first and second plurality of teeth 168, 170 causes the body 154, and therefore the inlet pipe 116 to move upwards. Upon removal of the force, the biasing mechanism 172 will bias the inlet pipe 116 back to the lowered position. In the embodiment of FIG. 19, the inlet pipe 116 is configured to pivot in response to operation of a lever 166 operably coupled thereto into engagement with a first end 74 of a vacuum passage conduit 72 of a container 32. The movement mechanisms 150 illustrated and described herein are intended as an example only, and any suitable mechanism for moving the inlet pipe 116 to selectively form a seal with an attachment 30 is contemplated herein. Additionally, any of the movement mechanisms 150 may be used with any configuration of a reservoir assembly 110, 210 illustrated and described herein.

A user can separate the reservoir assembly from the base 22 of the food processing system 20, to empty the contents of the hollow interior 114 and/or clean the reservoir assembly 110. Inclusion of the reservoir assembly 110 within the vacuum system 52, protects the vacuum mechanism 54 from both inadequate air supply and contamination from food.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A reservoir assembly connectable to an attachment of a food processing system, the food processing system including a vacuum mechanism, the reservoir assembly comprising:
   a housing having a hollow interior arrangeable in fluid communication with the vacuum mechanism, the housing including walls defining a fluid path through said hollow interior to the vacuum mechanism, the fluid path extending upwardly from a lower surface of the hollow interior to an upper surface of the hollow interior such that particulate in the fluid path accumulates on the lower surface while air flows to the upper surface; and
   an inlet pipe extending through said housing into said hollow interior, said inlet pipe being movable relative to said housing to form a seal with the attachment.

2. The reservoir assembly of claim 1, wherein said inlet pipe is translatable relative to said housing.

3. The reservoir assembly of claim 1, wherein said inlet pipe is pivotable relative to said housing.

4. The reservoir assembly of claim 1, wherein said inlet pipe is movable between a first position and a second position and, in said first position, an end of said inlet pipe extends beyond an upper surface of said housing and, in said second position, said end of said inlet pipe is arranged flush with or vertically below said upper surface.

5. The reservoir assembly of claim 1, further comprising a movement mechanism operably coupled to said inlet pipe, said movement mechanism including a body and a biasing mechanism operably coupled to said body.

6. The reservoir assembly of claim 5, wherein said body includes a protrusion that extends beyond an upper surface of said housing, said protrusion including at least one angled surface.

7. The reservoir assembly of claim 6, wherein said body and said inlet pipe are movable in response to application of a force to said at least one angled surface.

8. The reservoir assembly of claim 7, wherein said force is generated as the attachment is moved laterally relative to said housing of the reservoir assembly.

9. The reservoir assembly of claim 5, wherein said movement mechanism further comprises a lever operably coupled to said body, said biasing mechanism being directly connected to said lever.

10. The reservoir assembly of claim 9, wherein said body includes a first plurality of teeth and said lever includes a second plurality of teeth arranged in meshing engagement with said first plurality of teeth.

11. The reservoir assembly of claim 9, wherein said body and said inlet pipe are movable in response to application of a force to said lever.

12. The reservoir assembly of claim 11, wherein said force is generated as the attachment is moved laterally relative to said housing of the reservoir assembly.

13. The reservoir assembly of claim 1, further comprising a valve positioned within said hollow interior, said valve being movable to control a flow of air provided to the vacuum mechanism via said fluid path.

14. The reservoir assembly of claim 13, wherein said valve is movable between a first position and a second position in response to a volume of contents of said hollow interior.

15. The reservoir assembly of claim 14, wherein said valve is a float valve, said float valve being buoyant relative to said volume of contents of said hollow interior.

16. The reservoir assembly of claim 14, wherein, when said valve is in said second position, an inlet to said fluid path is sealed.

17. The reservoir assembly of claim 16, wherein said an inlet is offset from a bottom surface of said housing.

18. The reservoir assembly of claim 16, wherein said valve includes a mating surface and said inlet includes a sealing ring, said mating surface and said sealing ring being engaged to seal a conduit when said valve is in said second position.

* * * * *